US012781948B2

(12) United States Patent
Hetrick et al.

(10) Patent No.: US 12,781,948 B2
(45) Date of Patent: Nov. 3, 2026

(54) DEPTH CONTROL SYSTEMS FOR RECESSED LUMINAIRES

(71) Applicant: SIGNIFY HOLDING B.V., Eindhoven (NL)

(72) Inventors: Westly Davis Hetrick, Atlanta, GA (US); Tanmay Ravindra Joshi, Pune (IN); Russell Bryant Green, Douglasville, GA (US); Jyoti Kumar, Tyrone, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 48 days.

(21) Appl. No.: 18/995,269

(22) PCT Filed: Jul. 11, 2023

(86) PCT No.: PCT/EP2023/069150
§ 371 (c)(1),
(2) Date: Jan. 16, 2025

(87) PCT Pub. No.: WO2024/017705
PCT Pub. Date: Jan. 25, 2024

(65) Prior Publication Data

US 2026/0243413 A1 Aug. 20, 2026

Related U.S. Application Data

(60) Provisional application No. 63/391,382, filed on Jul. 22, 2022.

(30) Foreign Application Priority Data

Aug. 2, 2022 (EP) .................................... 22188242

(51) Int. Cl.
*F21V 21/14* (2006.01)
*F21S 8/02* (2006.01)
*F21V 21/04* (2006.01)

(52) U.S. Cl.
CPC ................ *F21V 21/14* (2013.01); *F21S 8/02* (2013.01); *F21V 21/04* (2013.01)

(58) Field of Classification Search
CPC ............. F21V 21/14; F21V 21/04; F21S 8/02
See application file for complete search history.

(56) References Cited

U.S. PATENT DOCUMENTS 8,465,182 B1 * 6/2013 Davis .................... F21V 21/042 362/396
2011/0103062 A1 * 5/2011 Park ........................ F21V 21/04 362/277

(Continued)

FOREIGN PATENT DOCUMENTS

CN 208846249 U * 5/2019
CN 209262833 U 8/2019

(Continued)

*Primary Examiner* — Christopher E Dunay

(57) ABSTRACT

A depth control system for a recessed luminaire can include a frame having multiple slots and a first light source receiving feature disposed therein. The depth control system can also include a carriage slidably coupled to the frame, where the carriage includes an adjustment device receiving feature and a second light source receiving feature disposed therein. The depth control system can further include a resilient device coupled to and disposed between the frame and the carriage. The depth control system can also include an adjustment device rotatably coupled to the carriage, where the adjustment device includes a first portion having a user device receiving feature configured to receive a user device and a second portion having a base and a flange that extends away from the base, where the flange includes an engage- (Continued)

ment portion that engages the slots in the frame when the engagement portion is positioned adjacent to the slots.

15 Claims, 17 Drawing Sheets

(56) References Cited

U.S. PATENT DOCUMENTS

| | | | | |
|---|---|---|---|---|
| 2016/0131317 | A1* | 5/2016 | Doyon | F21V 3/049<br>362/365 |
| 2022/0349535 | A1* | 11/2022 | Sonneman | F21S 8/026 |
| 2025/0137621 | A1* | 5/2025 | Wright | F21S 8/026 |

FOREIGN PATENT DOCUMENTS

| | | | |
|---|---|---|---|
| CN | 114321845 | A | 4/2022 |
| GB | 1274827 | A | 5/1972 |
| JP | 2020053126 | A | 4/2020 |
| KR | 101017631 | B1 | 2/2011 |
| KR | 20130117940 | A | 10/2013 |
| TW | 201137273 | A | 11/2011 |

* cited by examiner

DEPTH CONTROL SYSTEMS FOR RECESSED LUMINAIRES

CROSS-REFERENCE TO PRIOR APPLICATIONS

This application is the U.S. National Phase application under 35 U.S.C. § 371 of International Application No. PCT/EP2023/069150, filed on Jul. 11, 2023, which claims the benefit of European Patent Application No. 22188242.6, filed on Aug. 2, 2022, and U.S. Provisional Application No. 63/391,382, filed on Jul. 22, 2022. These applications are hereby incorporated by reference herein.

TECHNICAL FIELD

The present disclosure relates generally to recessed luminaires, and more particularly to systems, methods, and devices for depth control systems for recessed luminaires.

BACKGROUND

Recessed luminaires are mostly hidden from view once installed, with most of a recessed luminaire being positioned above a ceiling or other part of a structure. However, the bottom or distal end (often the trim) of a recessed luminaire is visible. Recessed luminaires can vary in size, from an inch or two in diameter to as much as six inches or more in diameter. A user may want to make certain adjustments (e.g., tilt, rotation, depth) to the recessed luminaire once it is installed. However, particularly for small recessed luminaires, these adjustments can be difficult to make without removing the recessed luminaire, making the adjustments, and then reinstalling the recessed luminaire, which results in a time consuming process that can be destructive and labor-intensive results in the form of ripping down and repairing the ceiling.

SUMMARY

In general, in one aspect, the disclosure relates to a depth control system for a recessed luminaire. The depth control system can include a frame comprising a plurality of slots and a first light source receiving feature disposed therein. The depth control system can also include a carriage slidably coupled to the frame, wherein the carriage comprises an adjustment device receiving feature and a second light source receiving feature disposed therein. The depth control system can further include a resilient device coupled to and disposed between the frame and the carriage. The depth control system can also include an adjustment device rotatably coupled to the carriage, wherein the adjustment device comprises a first portion and a second portion, wherein the first portion comprises a user device receiving feature configured to receive a user device, wherein the second portion comprises a base and a flange that extends away from the base, wherein the flange comprises an engagement portion that is configured to engage the plurality of slots in the frame when the adjustment device is rotated to position the engagement portion of the flange adjacent to the plurality of slots, wherein the flange rotates about an axis along a length of the first portion of the adjustment device when the user device receiving feature of the first portion is engaged by the user device to adjust a distance between the second light source receiving feature of the carriage and the first light source receiving feature of the frame.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
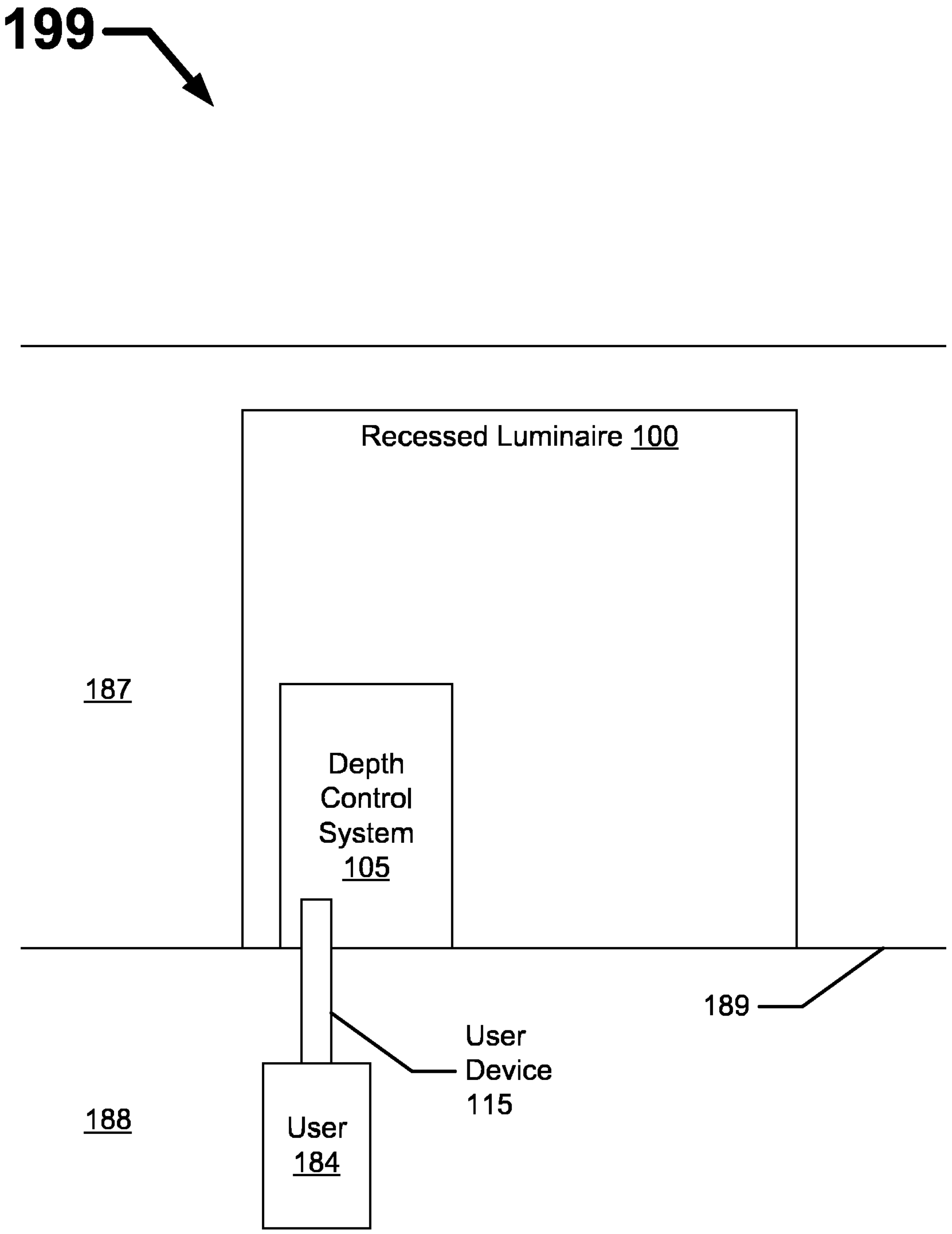
FIG. 1 shows a block diagram for a recessed luminaire system according to certain example embodiments.

In general, example embodiments provide systems, methods, and devices for depth control systems for recessed luminaires. Example embodiments can provide a number of benefits. Such benefits can include, but are not limited to, fewer parts to keep in inventory, modularity, user control, and simple configurability. Example embodiments can be used with new recessed luminaires or retrofit with existing recessed luminaires. Example embodiments described herein can be used with recessed luminaires having any of a number of sizes (e.g., 1 inch, 3 inches, 4 inches, 5 inches, 6 inches), any of a number of housing shapes (e.g., a cylinder, a rectangular cuboid), any of a number of configurations (e.g., with a can, without a can), and any shape (e.g., circular flanged, square flanged, conical flangeless, conical square flanged) of trim. As used herein, a luminaire is a general term that can include a light fixture, a lighting device, an illumination fixture, and similar devices.

Recessed luminaires with example depth control systems can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Recessed luminaires with example depth control systems can be integrated into any of a number of different structures. Such structures can include, but are not limited to, drywall, wood studs, concrete, and ceiling tile. A user may be any person that interacts with recessed luminaires. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Recessed luminaires with example depth control systems (including portions thereof) can be made of one or more of a number of suitable materials to allow the recessed luminaire to meet certain standards and/or regulations while also maintaining durability in light of the one or more conditions under which the recessed luminaires and/or other associated components of the recessed luminaire can be exposed. Examples of such materials can include, but are not limited to, aluminum, stainless steel, fiberglass, glass, plastic, polymer, ceramic, and rubber.

Example depth control systems, or portions or components thereof, described herein can be made from a single piece (as from a mold, injection mold, die cast, or extrusion process). In addition, or in the alternative, example depth control systems (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example depth control system to become coupled, directly or indirectly, to one or more other components (e.g., a trim, a housing) of a recessed luminaire and/or a structure (e.g., a stud, drywall, a beam). A coupling feature can include, but is not limited to, a clamp, a portion of a hinge, an aperture, a recessed area, a protrusion, a hole, a slot, a tab, a detent, and mating threads. One portion of an example depth control system can be coupled to a component (e.g., a trim, a housing) of a recessed luminaire and/or a structure by the direct use of one or more coupling features.

In addition, or in the alternative, a portion of an example depth control system can be coupled to a component (e.g., a trim, a housing, some other component) of a recessed luminaire and/or a structure using one or more independent devices that interact with one or more coupling features disposed on a component of the depth control system. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of depth control systems for recessed luminaires, one or more of the components shown may be omitted, repeated, and/or substituted. Accordingly, example embodiments of depth control systems for recessed luminaires should not be considered limited to the specific arrangements of components shown in any of the figures. For example, features shown in one or more FIGS. or described with respect to one embodiment can be applied to another embodiment associated with a different figure or description.

In certain example embodiments, recessed luminaires having example depth control systems are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the recessed luminaire to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of depth control systems for recessed luminaires will be described more fully hereinafter with reference to the accompanying drawings, in which example embodiments of depth control systems for recessed luminaires are shown. Depth control systems for recessed luminaires may, however, be embodied in many different forms and should not be construed as limited to the example embodiments set forth herein. Rather, these example embodiments are provided so that this disclosure will be thorough and complete, and will fully convey the scope of depth control systems for recessed luminaires to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation. Such terms are not meant to limit embodiments of depth control systems for recessed luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a block diagram of a recessed luminaire system 199 according to certain example embodiments. The recessed luminaire system 199 of FIG. 1 includes the recessed luminaire 100 and a user device 115. The user device 115 is configured to interact with the example depth control system 105 of the recessed luminaire 100 to adjust the height of the recessed luminaire 100 (or portions thereof, such as a light source). Examples of a user device 115 can include, but are not limited to, a manual screwdriver, a power screwdriver, a drill, and a lance. The user device 115 can be directly or indirectly controlled by a user 184. Examples of a user 184 can include, but are not limited to, an engineer, a tenant, a landlord, a homeowner, a business owner, an employee, a contractor, a consultant, and a company representative.

The recessed luminaire 100 is shown in FIG. 1 in a typical installation, where the recessed luminaire 100 is disposed in an aperture in a structure 189 (e.g., drywall in a ceiling, a ceiling tile). As a result, most of the recessed luminaire 100, including all of the depth control system 105, is positioned in a volume of space 187 (e.g., a plenum space) above the structure 189, while the remainder (e.g., part of the trim) of the recessed luminaire 100 is in a different volume of space 188 below the structure 189. The volume of space 188 is where light emitted from the recessed luminaire 100 is directed, for example to provide general illumination to the volume of space 188. The recessed luminaire 100 includes a number of components. Such components can include, but are not limited to, a trim, a heat sink, a sensor device, a controller, one or more light sources, a reflector, a driver (or other form of power source), a controller, a power transfer device (e.g., a transformer, a rectifier), an energy storage device (e.g., a battery), electrical wiring, circuit boards, a tilt control system, an angle control system, a lens or other optical device, an enclosure, and a housing.

Figure 2:
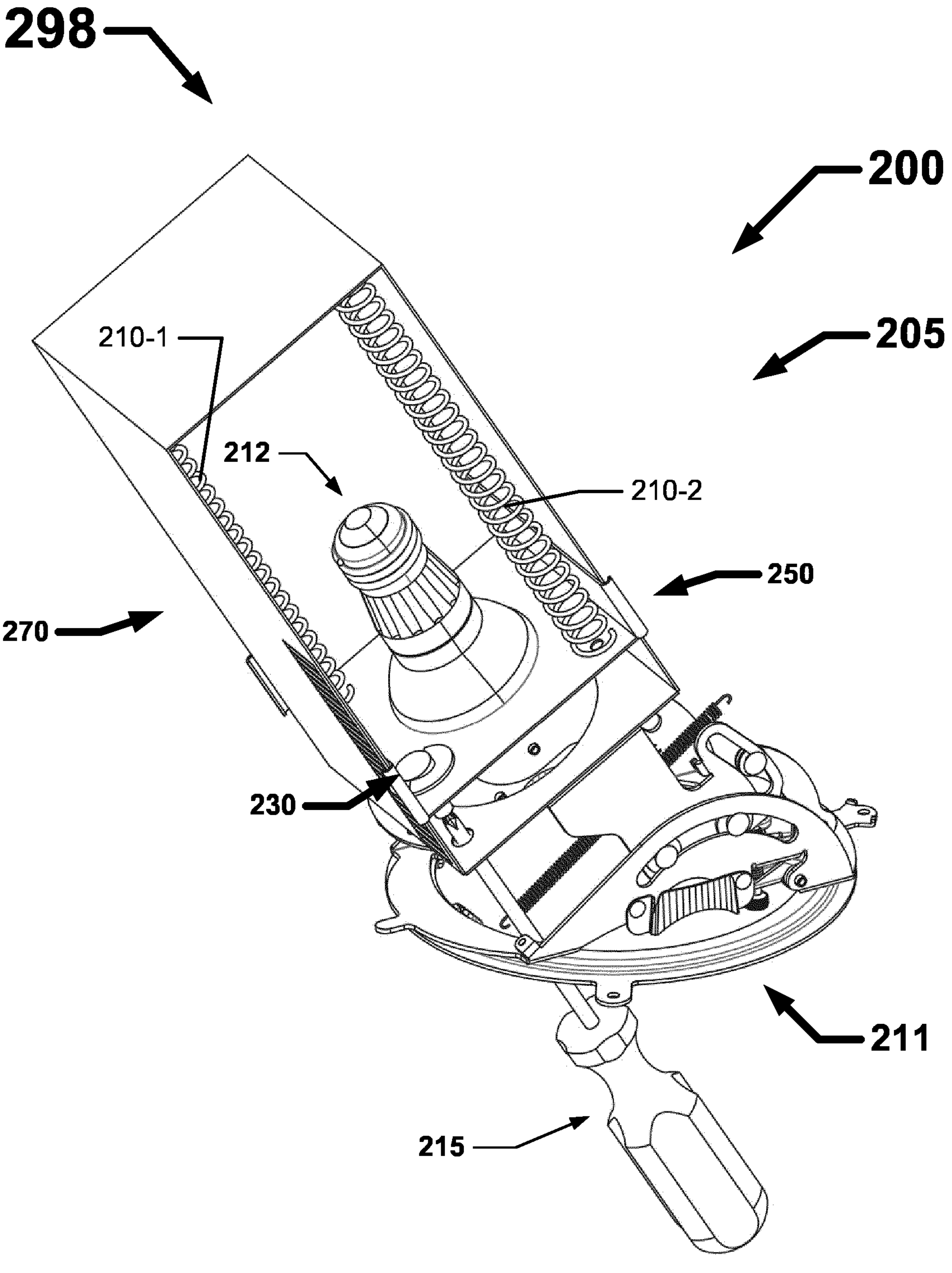
FIG. 2 shows a perspective view of a system that includes parts of a recessed luminaire having a depth control system according to certain example embodiments.

FIG. 2 shows a perspective view of a luminaire system 298 that includes parts of a recessed luminaire 200 having a depth control system 205 according to certain example embodiments. The luminaire system 298 of FIG. 2 also includes a user device 215. Referring to FIGS. 1 and 2, the user device 215, the recessed luminaire 200, and the associated depth control system 205 of the luminaire system 298 of FIG. 2 can be substantially the same as the user device 115, the recessed luminaire 100, and the associated depth control system 105 of FIG. 1. In this case, the user device 215 is in the form of a manual screwdriver. In addition to the depth control system 205, the parts of the recessed luminaire 200 shown in FIG. 2 includes a tilt and rotation control system 211 and a light source 212.

The light source 212 can be any type of light source assembly having one or more of any number of components (e.g., a bulb, a circuit board, an electrical wire, a resistor, a capacitor). The one or more light sources of the light source 212 can use any of a number of lighting technologies, including but not limited to a light-emitting diode (LED), an incandescent light source, a halogen light source, and an organic LED (OLED). The light source 212 can have or include one or more coupling features (e.g., an Edison socket (as in this case), some other type of electrical connector) that allows the light source 212 to electrically couple to another component of the recessed luminaire 200.

The depth control system 205 of the recessed luminaire 200 includes a frame 270, a carriage 250, two resilient devices 210 (resilient device 210-1 and resilient device 210-2), and an adjustment device 230. Detailed examples of the frame 270, the carriage 250, the resilient devices 210, and the adjustment device 230 of the depth control system 205 are discussed below with respect to FIGS. 3A through 7C. Other parts (e.g., an enclosure, a trim, a driver) of the recessed luminaire 200 are not shown in FIG. 2 so that the example depth control system 205 can be more clearly shown.

Figure 3A:
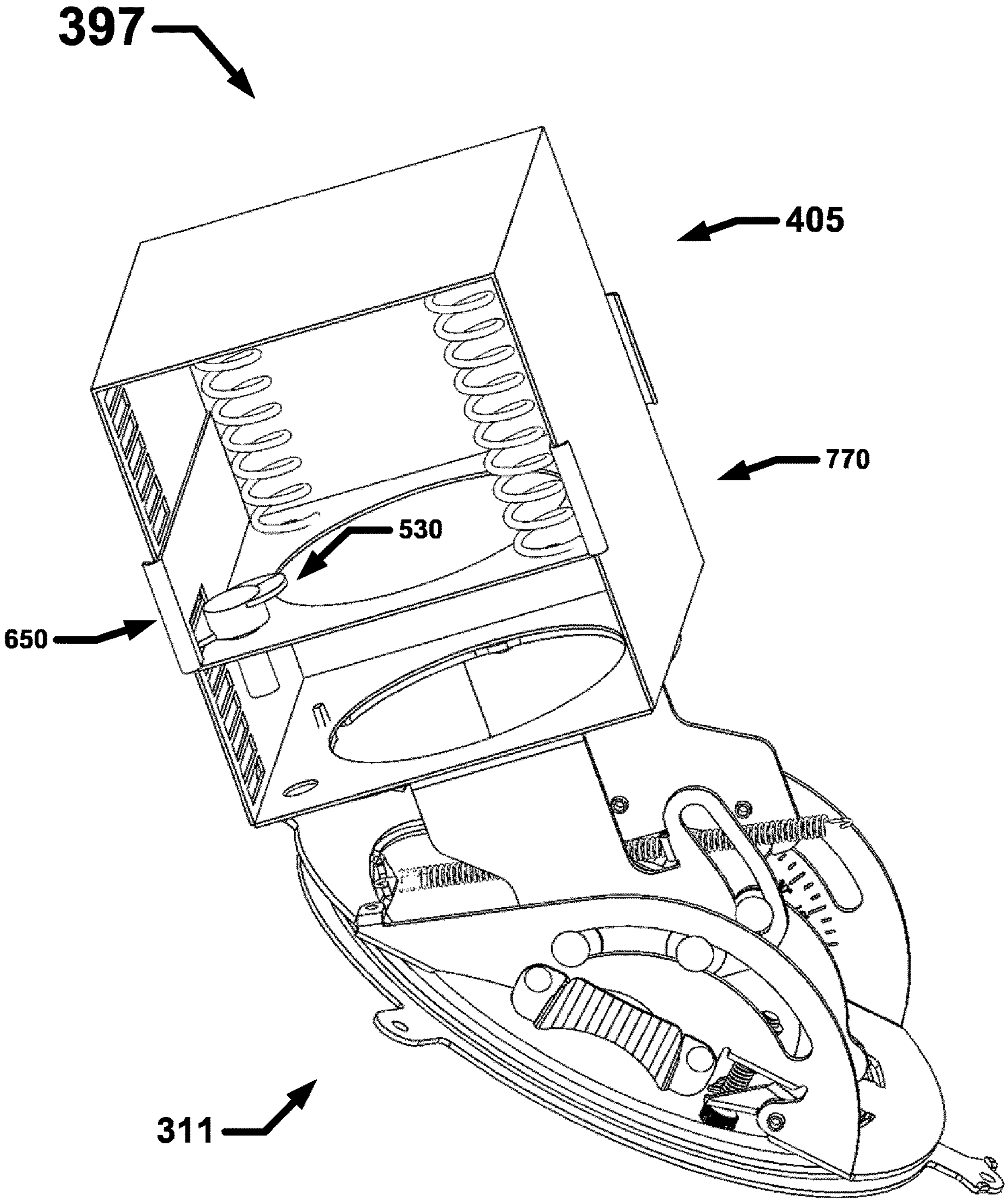
FIGS. 3A and 3B show various views of a subassembly of a recessed luminaire that includes a depth control system according to certain example embodiments.
Figure 3B:
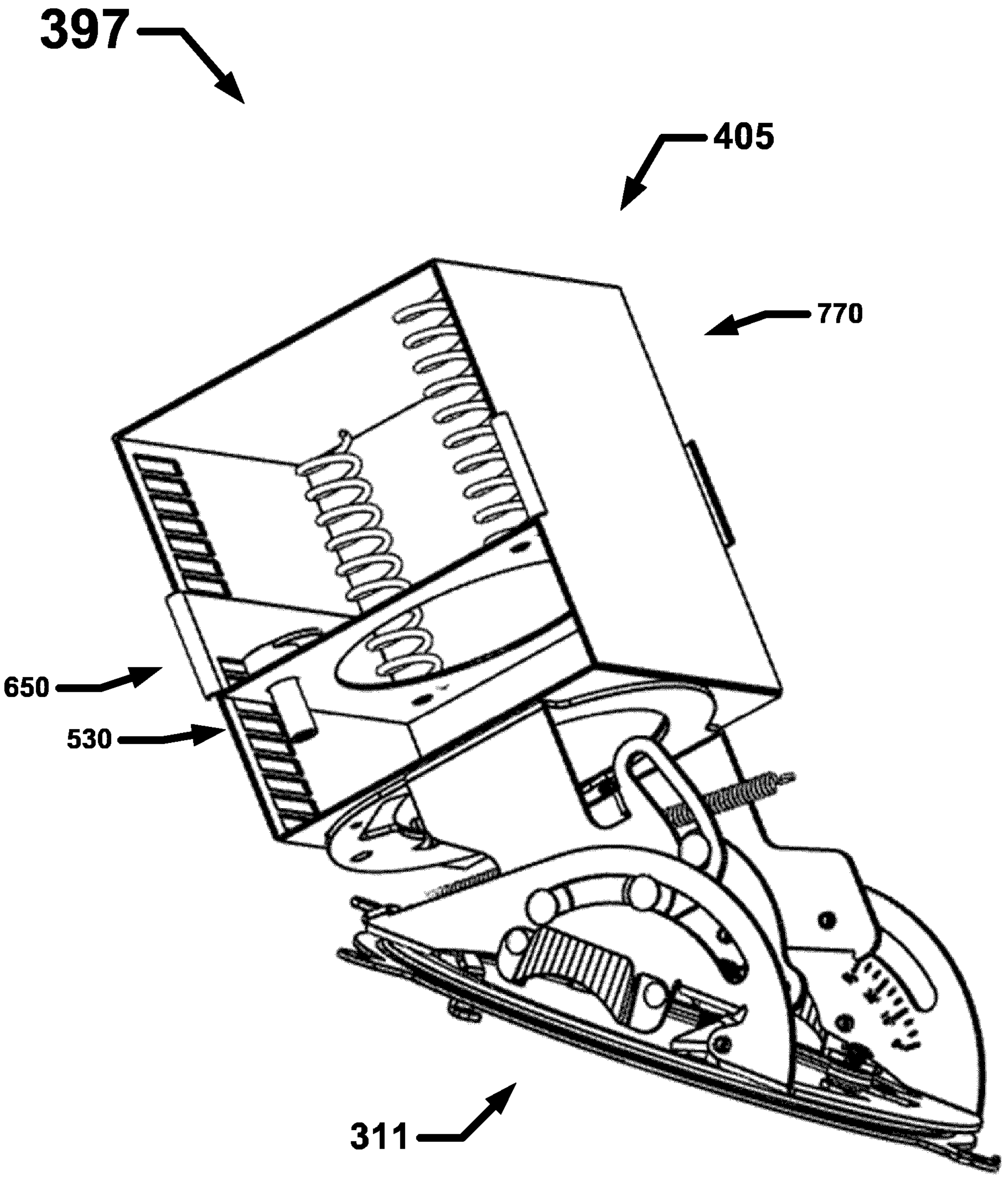
Figure 4A:
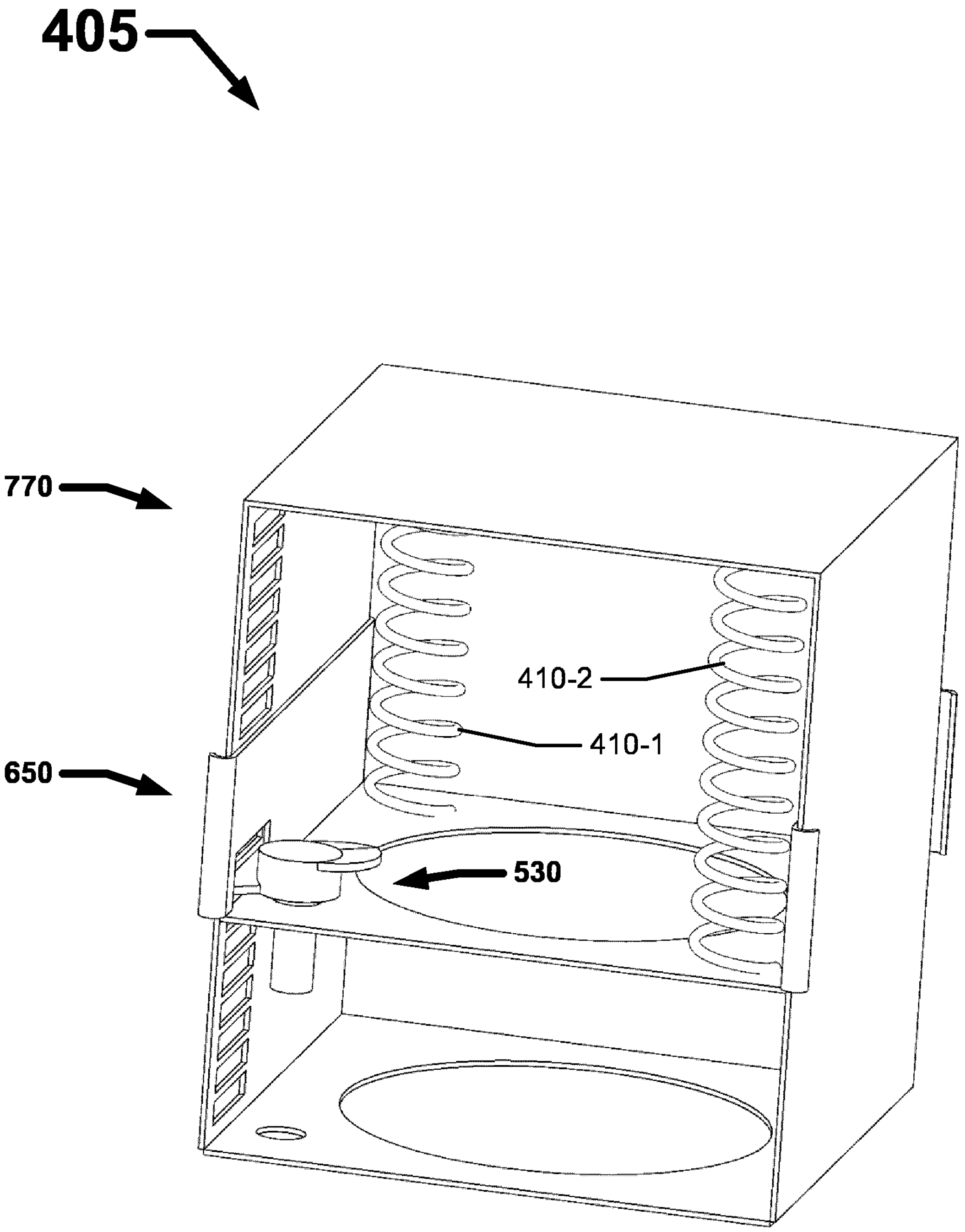
FIGS. 4A and 4B show a depth control system of FIGS. 3A and 3B according to certain example embodiments.
Figure 4B:
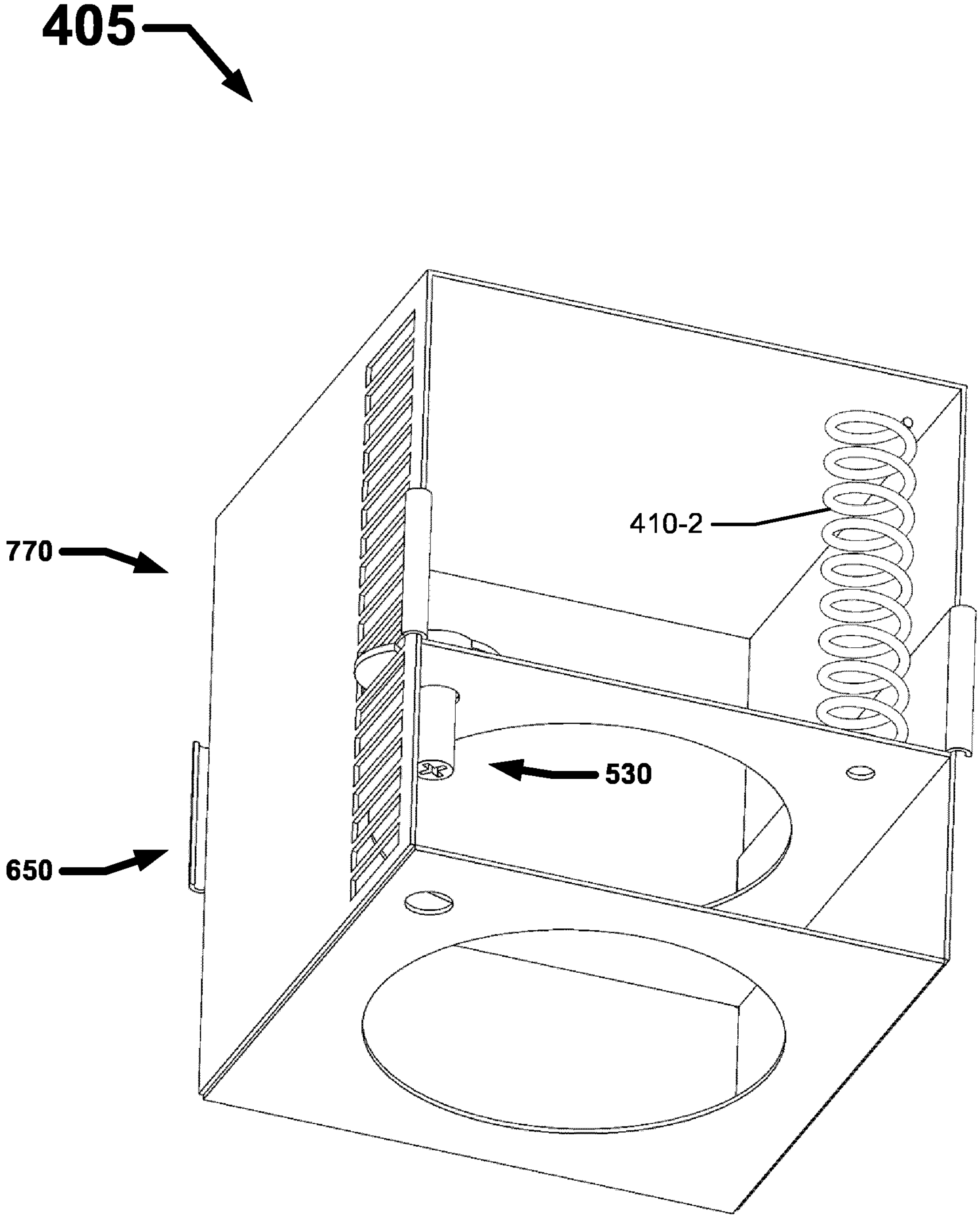

FIGS. 3A and 3B show a subassembly 397 of a recessed luminaire that includes a depth control system 405 according to certain example embodiments. Specifically, FIG. 3A shows a top-side perspective view of the subassembly 397, and FIG. 3B shows a bottom-side perspective view of the subassembly 397. The subassembly 397 of FIGS. 3A and 3B includes an example depth control system 405 and a tilt and rotation control system 311, which can be substantially the same as the depth control system 205 and the tilt and rotation control system 211 discussed above. FIGS. 4A and 4B show the depth control system 405 of FIGS. 3A and 3B according to certain example embodiments. Specifically, FIG. 4A shows a top-side perspective view of the depth control system 405, and FIG. 4B shows a bottom-side perspective view of the depth control system 405.

Figure 5A:
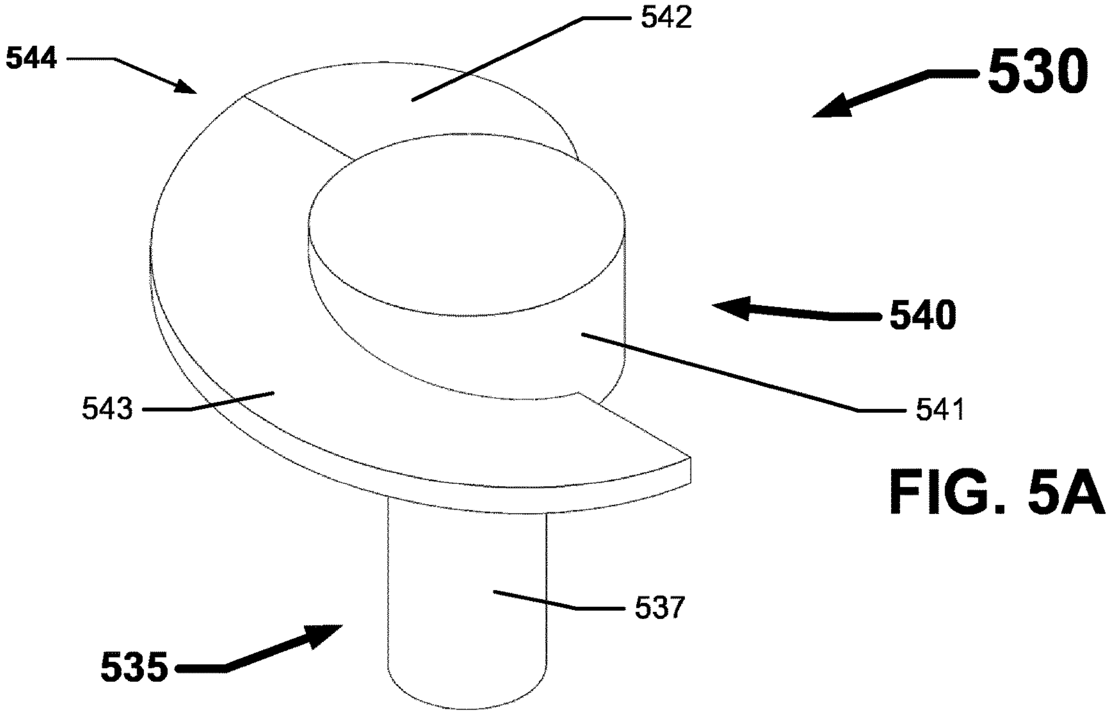
FIGS. 5A through 5E show the adjustment device of the depth control system of FIGS. 4A and 4B according to certain example embodiments.
Figure 5B:
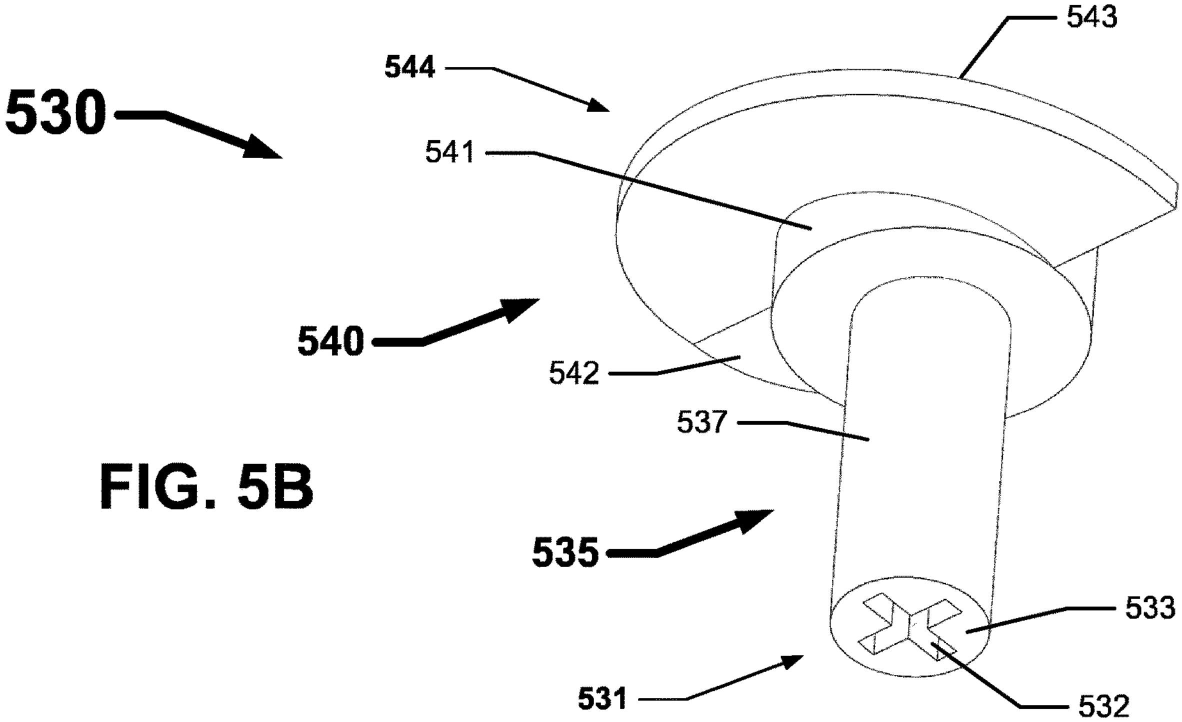
Figure 5C:
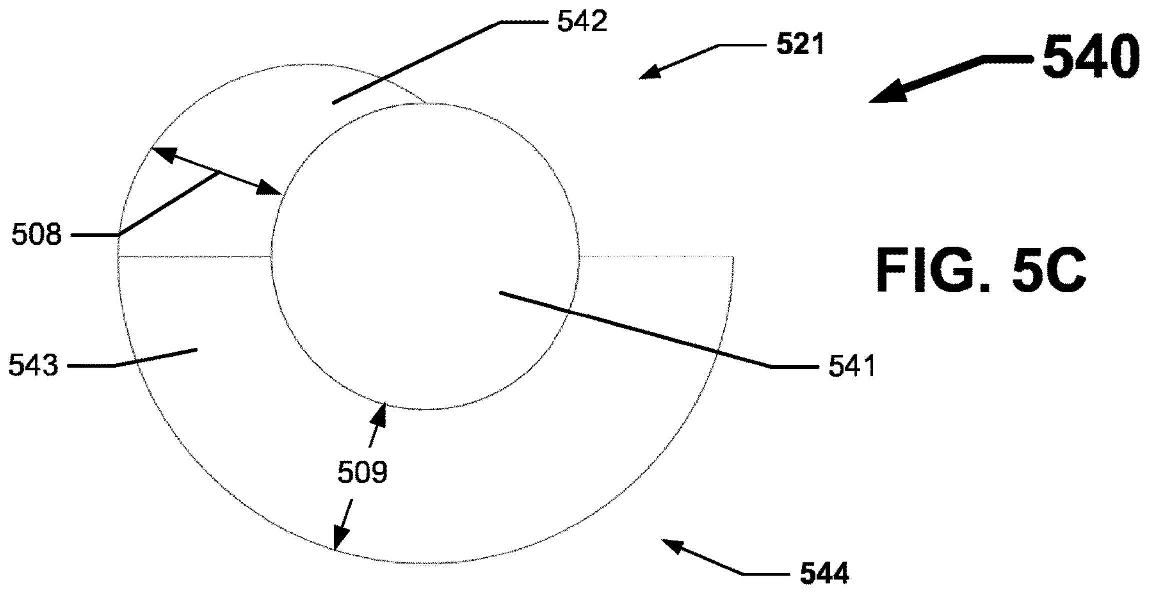
Figure 5D:
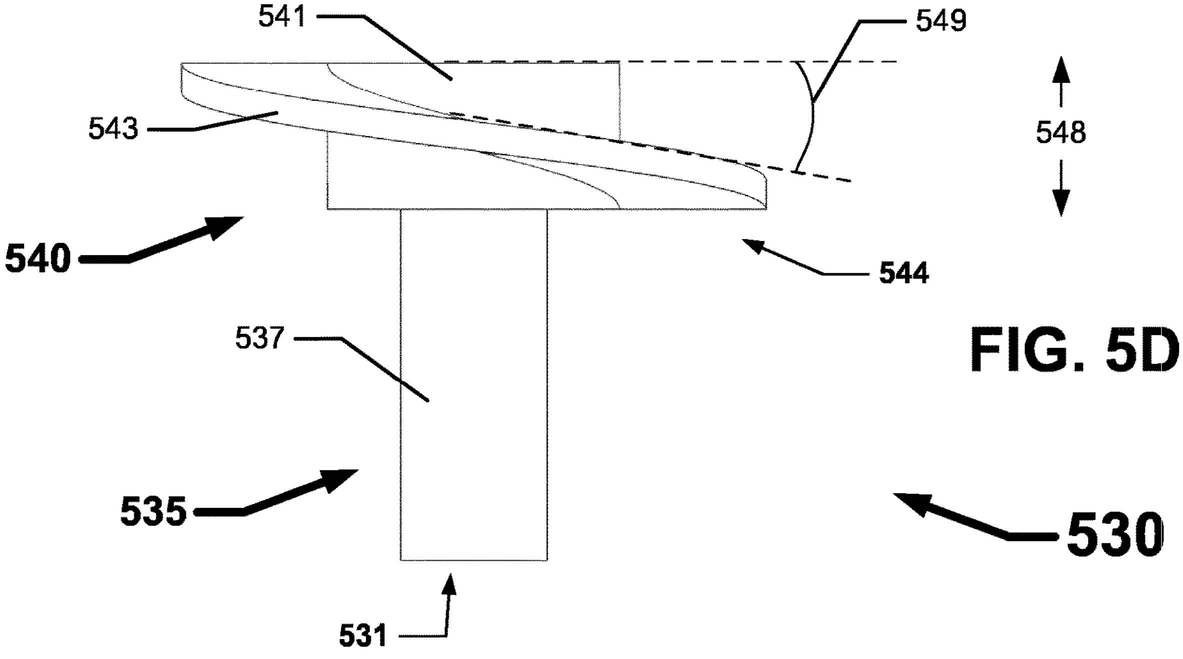
Figure 5E:
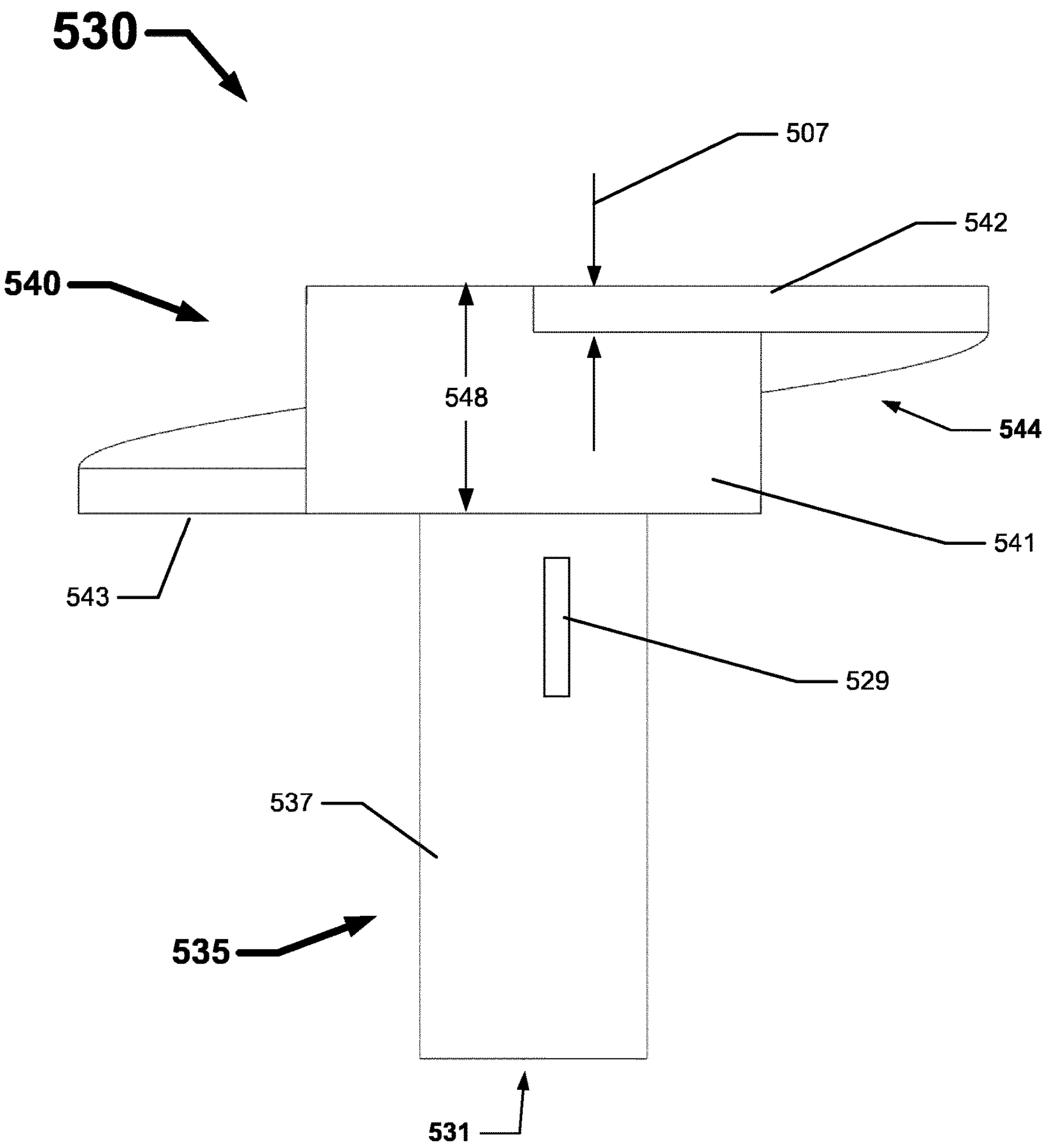

FIGS. 5A through 5E show the adjustment device 530 of the depth control system 405 of FIGS. 4A and 4B according to certain example embodiments. Specifically, FIG. 5A shows a top perspective view of the adjustment device 530. FIG. 5B shows a bottom perspective view of the adjustment device 530. FIG. 5C shows a top view of the top portion 540 of the adjustment device 530 of FIG. 5A. FIG. 5D shows a side view of the adjustment device 530. FIG. 5E shows a front view of the adjustment device 530.

Figure 6A:
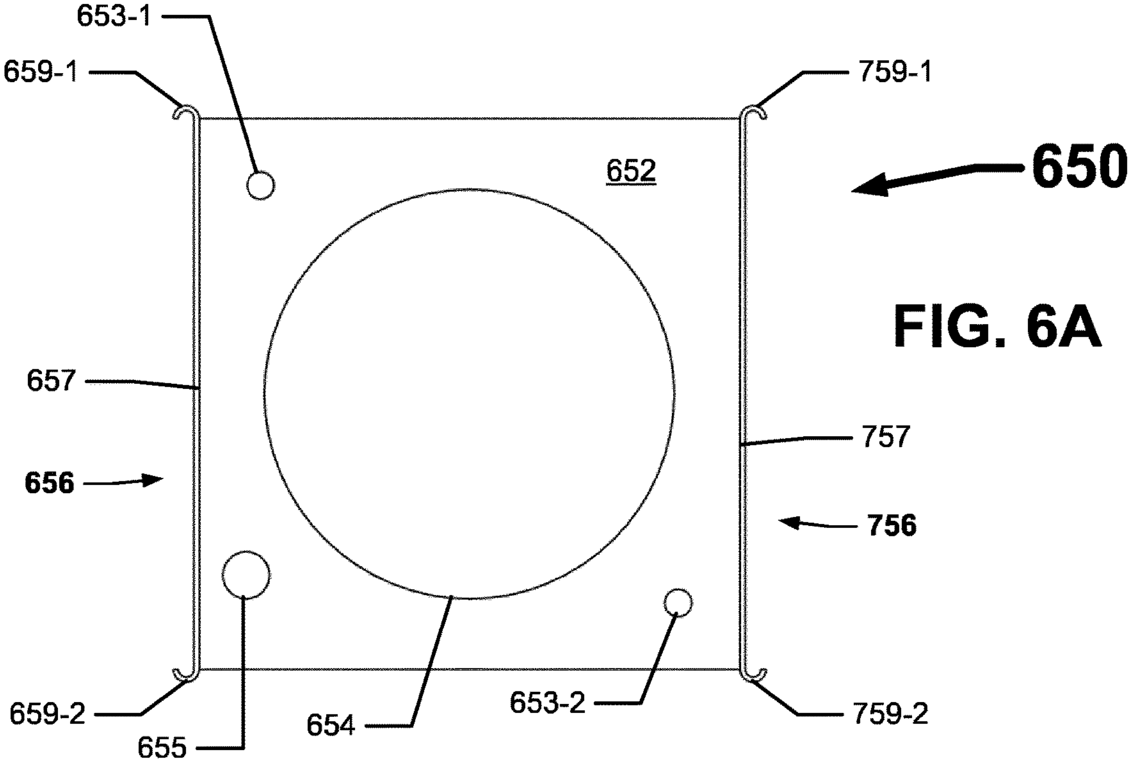
FIGS. 6A through 6C show the carriage of the depth control system of FIGS. 4A and 4B according to certain example embodiments.
Figure 6B:
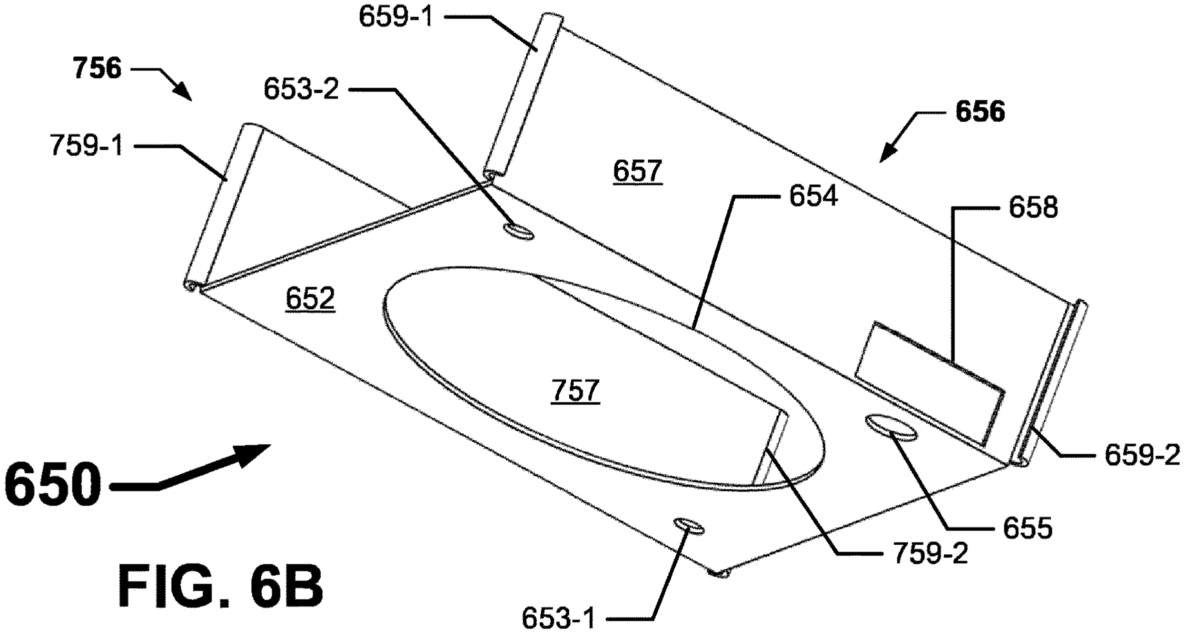
Figure 6C:
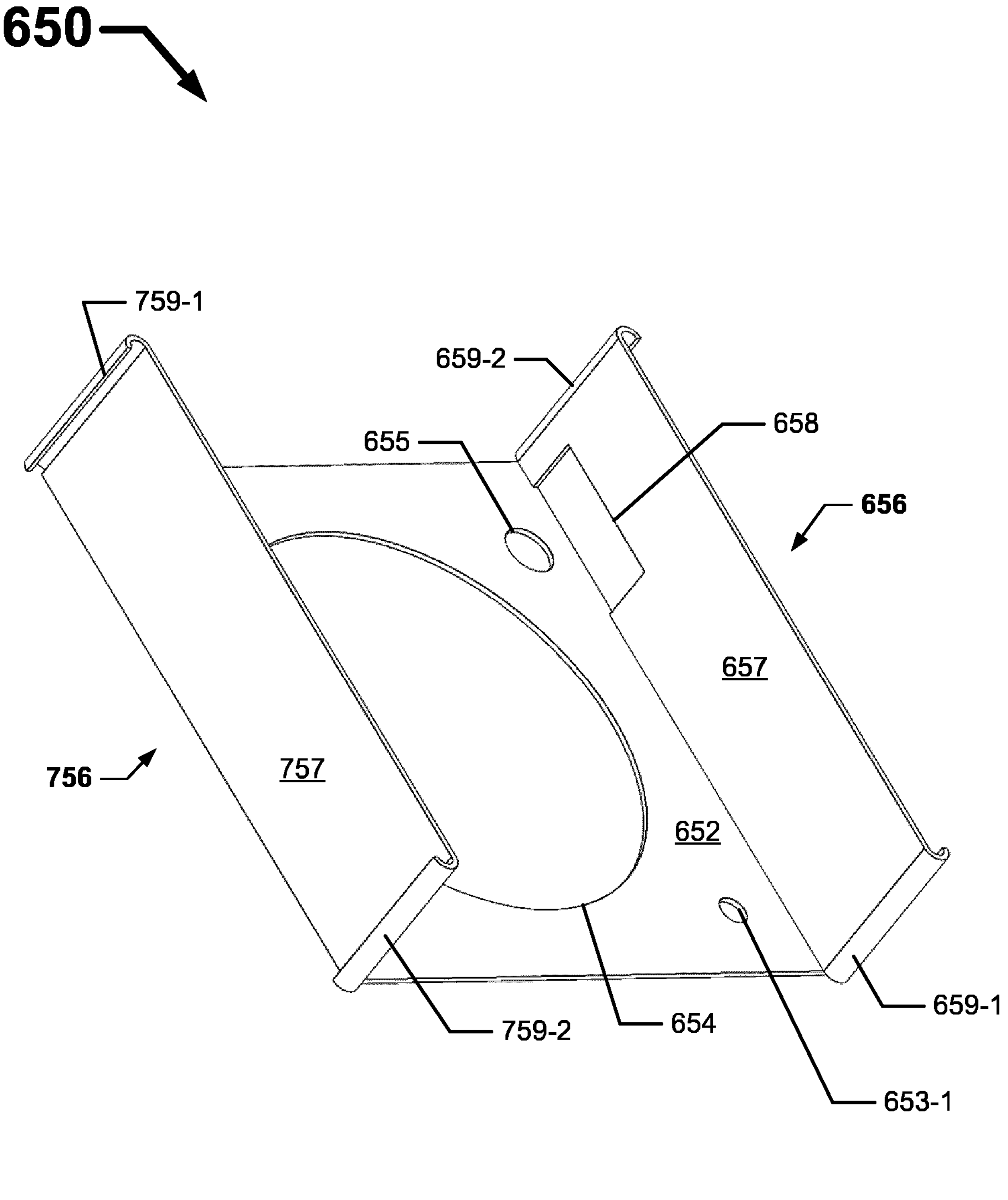
Figure 7A:
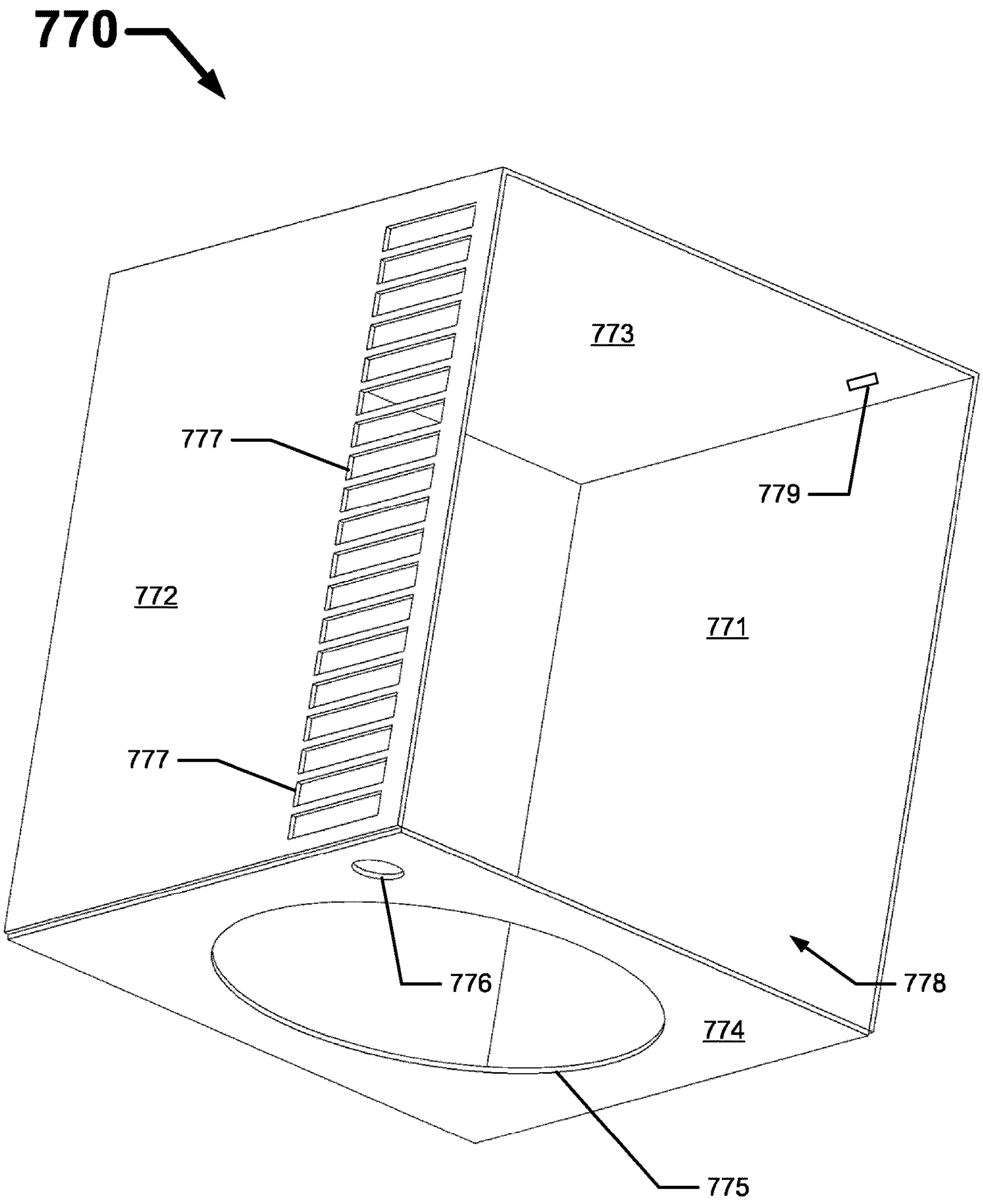
FIGS. 7A through 7C show the frame of the depth control system of FIGS. 4A and 4B according to certain example embodiments.
Figure 7B:
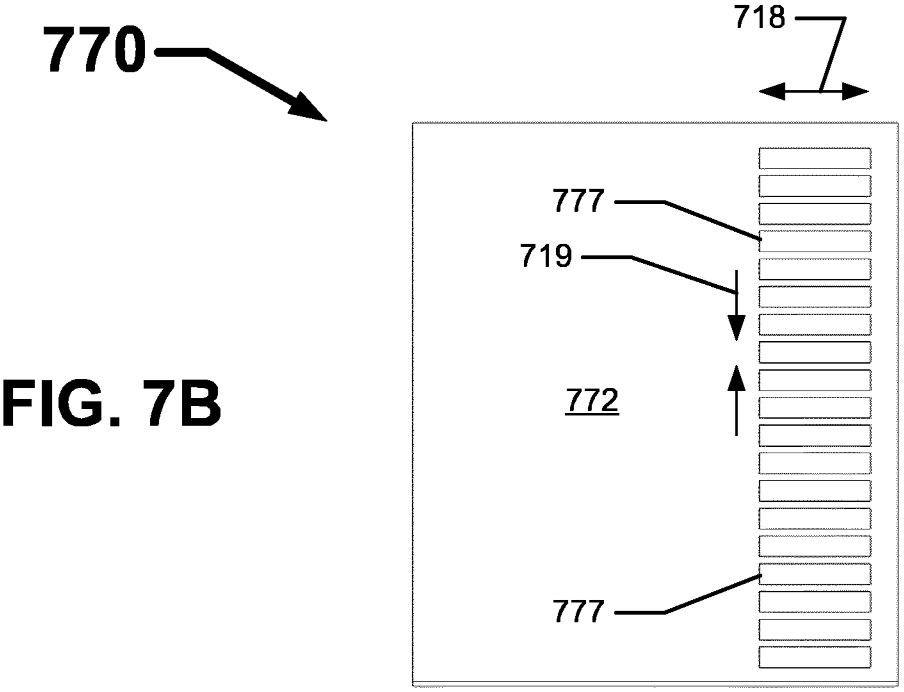
Figure 7C:
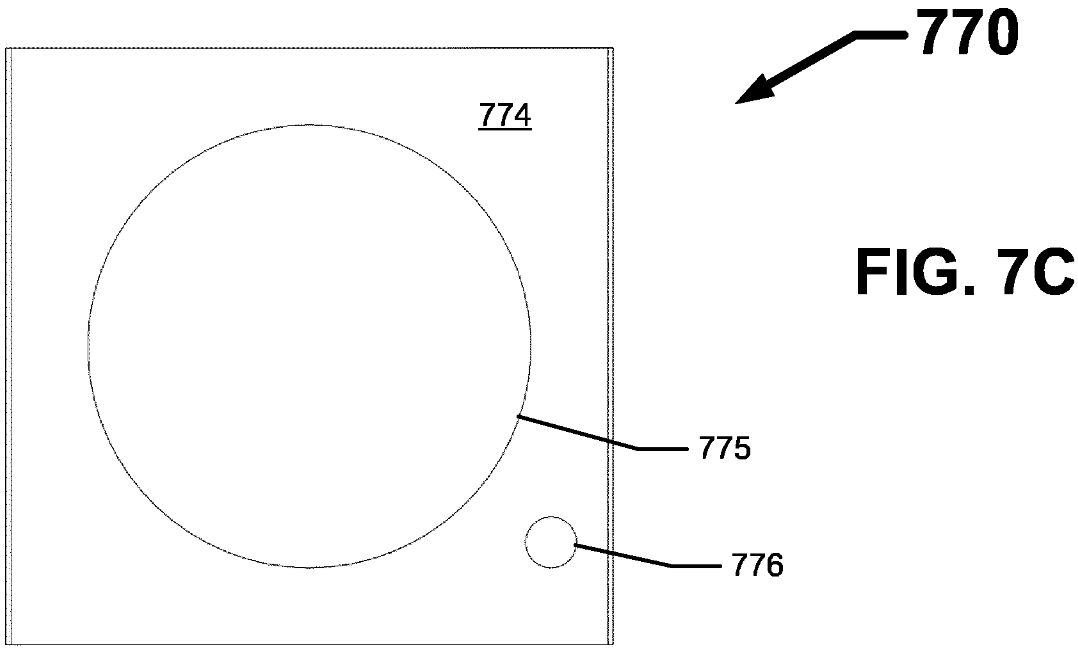

FIGS. 6A through 6C show the carriage 650 of the depth control system 405 of FIGS. 4A and 4B according to certain example embodiments. Specifically, FIG. 6A shows a top view of the carriage 650. FIG. 6B shows a bottom perspective view of the carriage 650. FIG. 6C shows a top perspective view of the carriage 650. FIGS. 7A through 7C show the frame 770 of the depth control system 405 of FIGS. 4A and 4B according to certain example embodiments. FIG. 7A shows a bottom perspective view of the frame 770. FIG. 7B shows a side view of the frame 770. FIG. 7C shows a bottom view of the frame 770.

Referring to FIGS. 1 through 7C, the frame 770 of the example depth control system 405 serves as a fixed component relative to which the carriage 650 can move. The frame 770 can include multiple features and components. For example, in this case, the frame 770 includes a base wall 774 (also sometimes called a base frame wall 774), a left side wall (also sometimes called a left side frame wall 772), a right side wall 771 (also sometimes called a right side frame wall 771), and a top wall 773 (also sometimes called a top frame wall 773). In some cases, as in this example, there is no front wall or back wall, leaving the cavity 778 formed between the base wall 774, the left side wall 772, the right side wall 771, and the top wall 773 open on these sides. In alternative embodiments, the frame 770 can include a front wall and/or a back wall.

The top wall 773 can include one or more coupling features 779 (e.g., clips (as in this case), apertures, recesses) disposed in or on its bottom surface. Such coupling features 779 can be used to secure one end (e.g., the top end) of the resilient devices 410. For example, coupling feature 779 shown in FIG. 7A can be used to couple to (e.g., secure) the top end of resilient device 410-1.

In certain example embodiments, one of the side walls can include one or more features that are configured to engage an engagement portion 543 of a flange 544 of the adjustment device 530 (discussed below). For example, in this case, the left side wall 772 has multiple slots 777 that traverse the thickness of the left side wall 772. Each slot 777 has a height 719 and a width 718 that is larger than the height 507 and width of the engagement portion 543 of the flange 544 of the adjustment device 530 so that the engagement portion 543 of the flange 544 of the adjustment device 530 can be disposed within each of the slots 777 at different times. The slots 777 can have any of a number of configurations, whether individually and/or collectively. For example, in this case, each slot 777 is rectangular in shape, and all of the slots 777 have substantially the same height 719 and width 718. Further, the slots 777 in this example are arranged in a parallel configuration stacked atop each other along the height of the left side wall 772.

In certain example embodiments, the frame 770 can also include one or more features that allow for enabling movement of the carriage 650 (and so also the depth control system 405) by a user device (e.g., user device 115, user device 215). For example, in this case, the base wall 774 of the frame 770 includes an adjustment device access port 776 in the form of an aperture that traverses the thickness of the base wall 774. The adjustment device access port 776 can have any of a number of shapes (e.g., circular (as in this case), square, oval, random). Further, the adjustment device access port 776 can be of sufficient size (e.g., diameter) to allow a user device (e.g., user device 215) to pass therethrough and move (e.g., rotate) while occupying the adjustment device access port 776.

In some cases, the frame 770 can include one or more features to accommodate a light source (e.g., light source 212) of the recessed luminaire and/or allow light emitted therefrom to pass therethrough. For example, in this case, the base wall 774 of the frame 770 includes a light source receiving feature 775 in the form of an aperture that traverses the thickness of the base wall 774. The light source receiving feature 775 can have any of a number of shapes (e.g., circular (as in this case), square, oval, random). Further, the light source receiving feature 775 can be of sufficient size (e.g., diameter) to allow a light source (e.g., light source 212), light emitted from a light source, and/or some other component of a recessed luminaire to pass therethrough.

The carriage 650 of the example depth control system 405 serves as a component that is slidably coupled to the frame 770 to enable depth control. The carriage 650 can include multiple features and components. For example, in this case, the carriage 650 includes a base wall 652 (also sometimes called a base carriage wall 652), a left side wall assembly 656 (also sometimes called a left side carriage wall assembly 656), and a right side wall assembly 756 (also sometimes called a right side carriage wall assembly 756). The left side wall assembly 656 includes a left side wall 657 (also sometimes called a left side carriage wall 657) that extends upward (e.g., perpendicularly) from one end of the base wall 652. The right side wall assembly 756 includes a right side wall 757 (also sometimes called a right side carriage wall 757) that extends upward (e.g., perpendicularly) from an opposite end of the base wall 652 so that the left side wall 657 and the right side wall 757 are substantially parallel with each other.

In addition, the left side wall assembly 656 includes a curved end 659-1 at one end of the left side wall 657 and another curved end 659-2 at the opposite end of the left side wall 657. The two curved ends 659 of the left side wall assembly 656 can be configured to wrap around opposite sides of the left side wall 772 of the frame 770. In this way, the two curved ends 659 of the left side wall assembly 656 remain engaged with the sides of the left side wall 772 of the frame 770 along entire height of the left side wall 772. In alternative embodiments, rather than being curved, one or both ends 659 of the left side wall assembly 656 can have one or more of a number of other configurations (e.g., C-shaped) to serve the purpose of engaging a side of the left side wall 772 of the frame 770 as the carriage 650 slides vertically relative to the left side wall 772.

Similarly, the right side wall assembly 756 includes a curved end 759-1 at one end of the left side wall 757 and another curved end 759-2 at the opposite end of the left side wall 757. The two curved ends 759 of the left side wall assembly 756 can be configured to wrap around opposite sides of the right side wall 771 of the frame 770. In this way, the two curved ends 759 of the left side wall assembly 756 remain engaged with the sides of the right side wall 771 of the frame 770 along entire height of the left side wall 771. In alternative embodiments, rather than being curved, one or both ends 759 of the left side wall assembly 756 can have one or more of a number of other configurations (e.g., C-shaped) to serve the purpose of engaging a side of the right side wall 771 of the frame 770 as the carriage 650 slides vertically relative to the right side wall 771. In some cases, the right side wall assembly 756 (or portions thereof, such as the ends 759) can be omitted from the carriage 650.

In some cases, the configuration of the various components (e.g., height and width of the left side wall 657, size and curvature of the ends 659) of the left side wall assembly 656 of the carriage 650 can be substantially the same as corresponding configuration of the corresponding components of the right side wall assembly 756 of the carriage 650. In alternative cases, as in this example, the configuration of one or more of the components of the left side wall assembly 656 of the carriage 650 can differ from the configuration of one or more of the corresponding components of the right side wall assembly 756 of the carriage 650. Specifically, while the overall dimensions of the left side wall 657 and the right side wall 757 are substantially the same as each other, and while the ends 659 and the ends 759 are configured substantially the same as each other, the left side wall 657 has an opening 658 that traverses the thickness of the left side wall 657, and the right side wall 757 has no such opening. The opening 658 in this case is located adjacent to the adjustment device receiving feature 655 in the base wall 652 (discussed below). Further, the opening 658 overlaps some of the slots 777 in the left side wall 772 of the frame 770 when the carriage 650 is engaged with the frame 770.

The base wall 652 of the carriage 650 can include one or more features to accommodate a light source (e.g., light source 212) of a recessed luminaire and/or allow light emitted therefrom to pass therethrough. For example, in this case, the base wall 652 of the carriage 650 includes a light source receiving feature 654 in the form of an aperture that traverses the thickness of the base wall 652. The light source receiving feature 654 can have any of a number of shapes (e.g., circular (as in this case), square, oval, random). Further, the light source receiving feature 654 can be of sufficient size (e.g., diameter) to allow a light source (e.g., light source 212), light emitted from a light source, and/or some other component of a recessed luminaire to pass therethrough.

In some cases, as in this example, the characteristics (e.g., shape, size) of the light source receiving feature 654 in the base wall 652 of the carriage 650 can be substantially the same as the corresponding characteristics of the light source receiving feature 775 in the base wall 774 of the frame 770. Alternatively, one or more characteristics of the light source receiving feature 654 in the base wall 652 of the carriage 650 can differ from a corresponding characteristic of the light source receiving feature 775 in the base wall 774 of the frame 770.

In addition, or in the alternative, the base wall 652 of the carriage 650 can include one or more adjustment device receiving features 655 to accommodate the adjustment device 530 of the depth control system 405. For example, in this case, the base wall 652 of the carriage 650 includes an adjustment device receiving feature 655 in the form of an aperture that traverses the thickness of the base wall 652. The adjustment device receiving feature 655 can have any of a number of shapes (e.g., circular (as in this case), square, oval, random). Further, the adjustment device receiving feature 655 can be of sufficient size (e.g., diameter) to allow a portion of the adjustment device 530 to be disposed therein while also allowing the adjustment device 530 to freely rotate about an axis along the length of the adjustment device 530. In some cases, the adjustment device receiving feature 655 can include one or more features (e.g., a detent, a spring clip) that prevents or limits vertical movement of the adjustment device 530 while the adjustment device 530 is engaged with the adjustment device receiving feature 655.

In certain example embodiments, the base wall 652 of the carriage 650 can include one or more resilient device coupling features 653 for coupling to an end of a resilient device 410. For example, in this case, the base wall 652 of the carriage 650 includes resilient device coupling feature 653-1 and resilient device coupling feature 653-2, both in the form of apertures that traverse the thickness of the base wall 652. In this case, resilient device coupling feature 653-1 is configured to couple to the distal end of resilient device 410-1, and resilient device coupling feature 653-2 is configured to couple to the distal end of resilient device 410-2.

Each resilient device coupling feature 653 is configured to complement a corresponding coupling feature (or other similar feature) of a resilient device 410. Examples of such configurations of a resilient device coupling feature 653 can include, but are not limited to, an aperture, a detent, a hook, a tab, and a column. When there are multiple resilient device coupling features 653, the configuration of one resilient device coupling feature 653 can be the same as, or differ from, the configuration of one or more of the other resilient device coupling features 653.

An example depth control system 405 can include one or more resilient devices 410. Each resilient device 410 is configured to put the carriage 650 is some default position relative to the frame 770. A resilient device 410 can take on any of a number of forms and/or configurations. Examples of a resilient device 410 can include, but are not limited to, a compression spring (as in this case), a tension spring, an extension spring, a piston, and a hydraulic slide. The force (in this example, a downward force) applied by the one or more resilient devices 410 is not so strong as to break the engagement portion 543 of the flange 544 of the adjustment device 530 (discussed below) or disfigure one or more of the slots 777 in the frame 770. Further, the force applied by the one or more resilient devices 410 is not so strong as to offer too much resistance against an opposing (e.g., upward) force applied by a user (e.g., user 184), through the user device (e.g., user device 115), to the adjustment device 530 (and so the carriage 650), which allows the user to adjust the depth of the recessed luminaire (or portion thereof).

The adjustment device receiving feature 655 can be positioned on the base wall 652 of the carriage 650 in such a way that the engagement device 530, when coupled to (e.g., engaged with, disposed within) the adjustment device receiving feature 655, can engage one or more of the slots 777 in the frame 770 through the opening 658 in the left side wall 657 of the carriage 650. There can be multiple adjustment device receiving features 655 for a single engagement device 530. When there are multiple engagement devices 530, there can be one or more adjustment device receiving features 655 for each engagement device 530.

The adjustment device 530 of the example depth control system 405 serves as a component that engages with the slots 777 of the frame 770 to establish the depth of a recessed luminaire by being rotatably coupled to the carriage 650. The adjustment device 530 is held in place, to some degree (e.g., vertically), by the adjustment device engagement feature 655 of the carriage 650, while also being allowed to move freely (e.g., rotationally) in the adjustment device engagement feature 655.

The adjustment device 530 can include multiple portions, features, and components. For example, in this case, the adjustment device 530 includes a lower portion 535 and an upper portion 540. The lower portion 535 can include a user device receiving feature 531 disposed in a distal end of a shaft 537 of the lower portion 535. The shaft 537 can have any of a number of characteristics (e.g., a length, a cross-sectional shape, a diameter) suitable for the configuration of the carriage 650 and the frame 770.

In some cases, the shaft 537 can also include one or more retention features 529 that prevent or limit the amount of vertical movement of the shaft 537 (and so the rest of the adjustment device 530) within the adjustment device engagement feature 655 of the carriage 650. Such retention features 529 can include, but are not limited to, a retractable protrusion on the shaft 537 (as shown in FIG. 5E), an aperture that traverses the shaft 537 for receiving a removable pin, and a detent along some or all of the outer perimeter of the shaft 537 at some height along the shaft 537. In this way, at least part of the purpose of such a retention feature 529 is to limit or eliminate upward movement relative to the carriage 650 so that the carriage 650 and the adjustment device 530 move in tandem in the upward direction.

The user device receiving feature 531 of the lower portion 535 of the adjustment device 530 is configured to receive a user device (e.g., user device 115, user device 215) so that the user device can manipulate (e.g., rotate) the adjustment device 530 (and so the rest of the depth control system 405), thereby allowing a user, through multiple actions (e.g., pushing, pulling, rotating) taken in some sequence with the user device, to adjust the depth of a recessed luminaire (or portion thereof).

The user device receiving feature 531 of the lower portion 535 of the adjustment device 530 can have any of a number of configurations. For example, as in this case, the user device receiving feature 531 can be a recessed area 532 in a bottom surface 533 of the shaft 537 of the lower portion 535 of the adjustment device 530. The recessed area 532 in this case is an X-shape that can receive a Phillips head or a flat head screwdriver (a form of a user device) or drive bit. In alternative embodiments, the recessed area 532 can have any of a number of other shapes and/or sizes that are configured to complement and receive the configuration of the user device.

The upper portion 540 of the adjustment device 530 can also include one or more features and/or components. For example, as in this case, the upper portion 540 can include a base 541 and a flange 544 that extends away (in this case, laterally) from the base 541. The base 541 of the upper portion 540 can have a configuration similar to the shaft 537 of the lower portion 540. In this example, the base 541 is cylindrically shaped where the axis along its length 548 (also sometimes called its height 548) is the same as the axis along the length of the shaft 537. Also, the diameter of the base 541 is greater than the diameter of the shaft 537 in this example. Specifically, the diameter of the base 541 is configured to be larger than the diameter (or other size) of the adjustment device receiving feature 655 in the base wall 652 of the carriage 650.

In this way, when the shaft 537 of the adjustment device 530 is disposed in the adjustment device receiving feature 655 in the base wall 652 of the carriage 650, at least part of the bottom surface of the base 541 is configured to abut against the top surface of the base wall 652 of the carriage 650. In other words, at least part of the purpose of the base 541 is to limit or eliminate downward movement relative to the carriage 650 so that the carriage 650 and the adjustment device 530 move in tandem in the downward direction. This feature of the base 541 complements the retention feature 529 on the shaft 537 of the bottom portion 535 of the adjustment device 530. In certain example embodiments, the distance between the bottom of the base 541 of the upper portion 540 and the top of the retention feature 529 on the shaft 537 of the bottom portion 535 is at least as great as the thickness of the base wall 652 of the carriage 650.

Another purpose of the base 541 of the upper portion 540 of the adjustment device 530 is to support and position the flange 544. The flange 544 of the adjustment device 530 facilitates whether the carriage can move within the cavity 778 of the frame 770 or is held in a stationary position within the cavity 778 of the frame 770, thereby adjusting and setting the depth of a recessed luminaire (or portion thereof). The flange 544 accomplishes this purpose by disengaging with the slots 777 in the frame 770 and engaging with one or more slots 777 in the frame 770, respectively.

The flange 544 can have one or more portions. For example, the flange 544 can include an engagement portion 543 that is configured to engage one or more of the slots 777 in the frame 770 when the adjustment device 530 is rotated to position the engagement portion 543 of the flange 544 adjacent to the slots 777, as shown in FIG. 4B above and FIG. 8B below. When the engagement portion 543 is disposed in one or more of the slots 777 in the frame 770, and when the adjustment device 530 is not being rotated, the carriage 650 is held stationary relative to the frame 770, thereby preventing the depth of the recessed luminaire (or portion thereof) disposed in the cavity 778 of the frame 770 from being adjusted. Put another way, when the engagement portion 543 is disposed in one or more of the slots 777 in the frame 770, and when the adjustment device 530 is not being rotated, the distance between the light source receiving feature 654 in the base wall 652 of the carriage 650 and the light source receiving feature 775 in the base wall 774 of the frame 770 remains constant.

As discussed above, the engagement portion 543 of the flange 544 can have a height 507 that is less than the height 719 of any of the slots 777 in the frame 770. In addition, the engagement portion 543 of the flange 544 can have a width 509 that is great enough to extend through one or more slots 777 in the left side wall 772 of the frame 770 when the adjustment device 530 is rotatably coupled to the adjustment device receiving feature 655 in the base wall 652 of the carriage 650. The width 509 of the engagement portion 543 of the flange 544 can be constant (as in this case) or variable along the length of the engagement portion 543. When the width 509 is variable, the width 509 exceeds a minimum distance needed to allow that portion of the engagement portion 543 of the flange to extend through a slot 777 in the frame 770.

The engagement portion 543 of the flange 544 can have any of a number of configurations. For example, as shown in FIGS. 5A through 5E, the engagement portion 543 of the flange 544 can be sloped (form an angle 549) relative to the horizontal top surface of the base 541 of the upper portion 540 of the adjustment device 530, creating a spiral configuration. In such a case, when the engagement portion 543 of the flange 544 is disposed in a slot 777 in the frame 770, and if the adjustment device 530 is being rotated, small increments of change ("fine tuning") in the depth (e.g., the distance between the light source receiving feature 654 in the base wall 652 of the carriage 650 and the light source receiving feature 775 in the base wall 774 of the frame 770) of a luminaire, or portion thereof, can be made.

When the engagement portion 543 of the flange 544 has a spiral, sloped, or angled configuration, the amount of slope can be the same (as in the example shown in FIGS. 5A through 5E) or vary along the length of the engagement portion 543. The engagement portion 543 of the flange 544 can traverse (in this case, continuously) along any amount (e.g., 270° (degrees), less than 270°, 360°, more than 360°, 540°, 90°) of the outer perimeter of the base 541 of the upper portion 540 of the adjustment device 530 when viewed from above. For example, as shown in FIG. 5C, the engagement portion 543 of the flange 544 can continuously traverse approximately 180° (one half) of the outer perimeter of the base 541 of the upper portion 540 of the adjustment device 530.

In some cases, as when the engagement portion 543 of the flange 544 traverses some amount less than 360° (e.g., 180°, 90°) of the outer perimeter of the base 541 of the upper portion 540 of the adjustment device 530 when viewed from above, the engagement portion 543 of the flange 544 can be horizontal (e.g., substantially parallel to the top surface of the base 541 of the upper portion 540 of the adjustment device 530). Under this configuration, there are no "fine tuning" depth adjustments that can be made by rotating the adjustment device 530.

In addition to an engagement portion 543, the flange 544 of the upper portion 540 of the adjustment device 530 can optionally include one or more nonengagement portions 542, as shown in FIGS. 5A through 5E. In such cases, a nonengagement portion 542 can extend away (e.g., laterally) from the base 541. A nonengagement portion 542 of the flange 544 can be located adjacent to the engagement portion 543 of the flange. A nonengagement portion 542 can have a width 508 that is less than the width 509 of the engagement portion 543 of the flange 544. The width 508 of a nonengagement portion 543 can be configured to be less than is needed to engage the slots 777 in the frame 770 when the adjustment device 530 is rotated in such a way as to position the nonengagement portion 542 of the flange 544 adjacent to the slots 777.

Figure 8A:
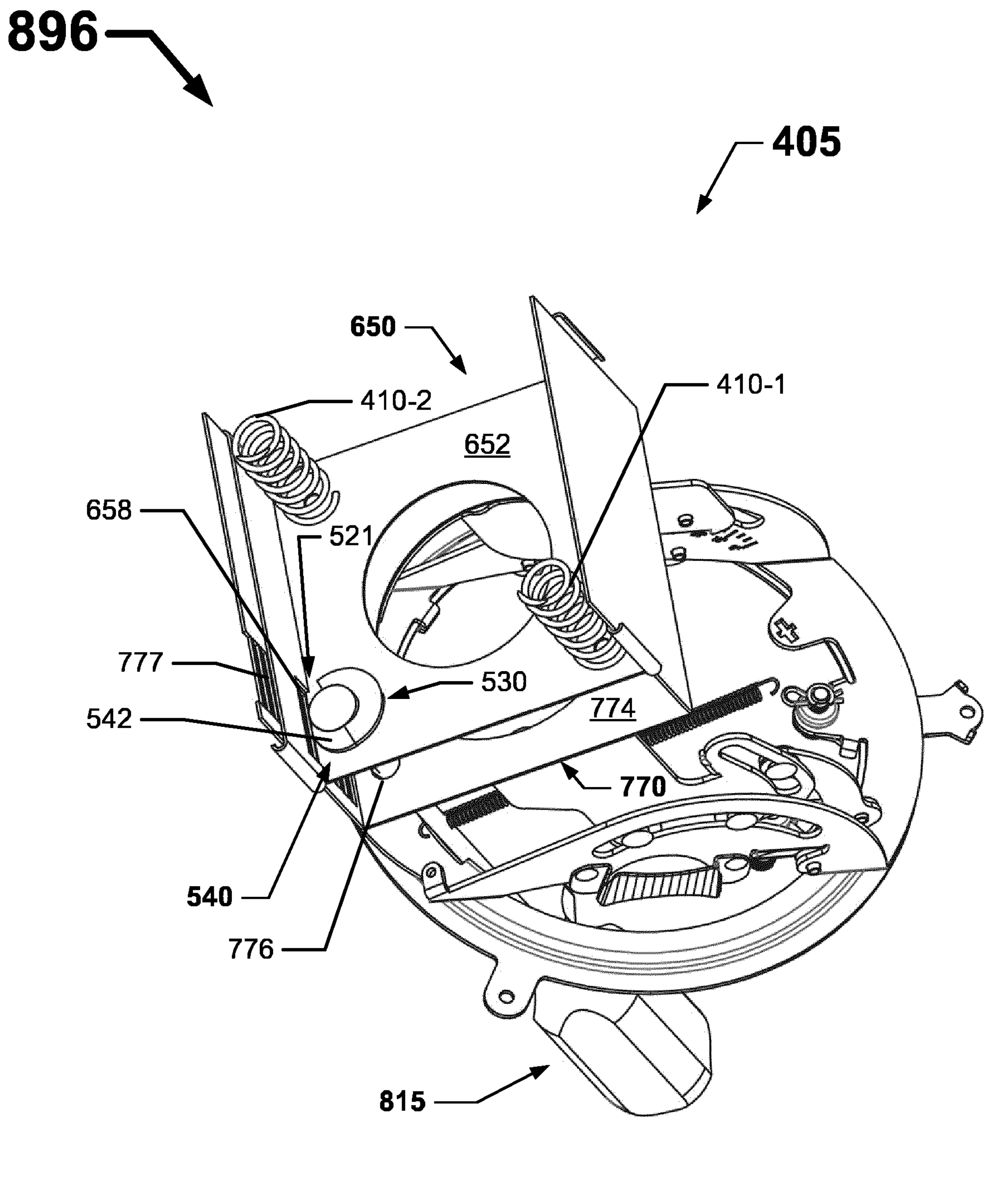
FIGS. 8A and 8B show sectional views of the subsystem of FIGS. 3A and 3B implementing the depth control system according to certain example embodiments.

As a result, when a nonengagement portion 542 is positioned adjacent to the slots 777 in the frame 770, as shown in FIG. 8A below, the carriage 650 is free to move vertically within the cavity 778 of the frame 770, either downward from the natural force applied by the resilient devices 410 or upward from an upward force supplied by a user (e.g., user 184), through the user device (e.g., user device 115), to the adjustment device 530 (and so the carriage 650), provided that this upward force is strong enough to overcome the natural downward force provided by the resilient devices 410.

The width 508 of a nonengagement portion 542 of the flange 544 can be constant or variable (as in this case) along the length of the nonengagement portion 542. In some cases, as in this example, a nonengagement portion 542 of the flange 544 can be oriented horizontally (e.g., parallel to the top surface of the base 541 of the upper portion 540 of the adjustment device 530). Alternatively, a nonengagement portion 542 of the flange 544 can be oriented at a slope or angle relative to the horizontal top surface of the base 541 of the upper portion 540 of the adjustment device 530, creating a spiral configuration. The nonengagement portion 542 of the flange 544 can traverse (in this case, continuously) along any amount (e.g., 180°, less than 180°, 90°) of the outer perimeter of the base 541 of the upper portion 540 of the adjustment device 530 when viewed from above.

In some cases, as in this case, there is a null area 521 where there is no part of the flange 544 that extends away from the outer surface of the base 541 of the upper portion 540 of the adjustment device 530. For example, as shown in FIG. 5C, there is a null area 521 for approximately the upper right quadrant of the top view of the upper portion 540 of the adjustment device 530. In this way, the null area 521 of the upper portion 540 serves the same function as a nonengagement portion 542 of the flange 544 in terms of manipulation of the adjustment device 530 to operate the depth control system 405 by failing to interact with the slots 777 in the frame 770 when the null area 521 is positioned adjacent to the slots 777.

Figure 8B:
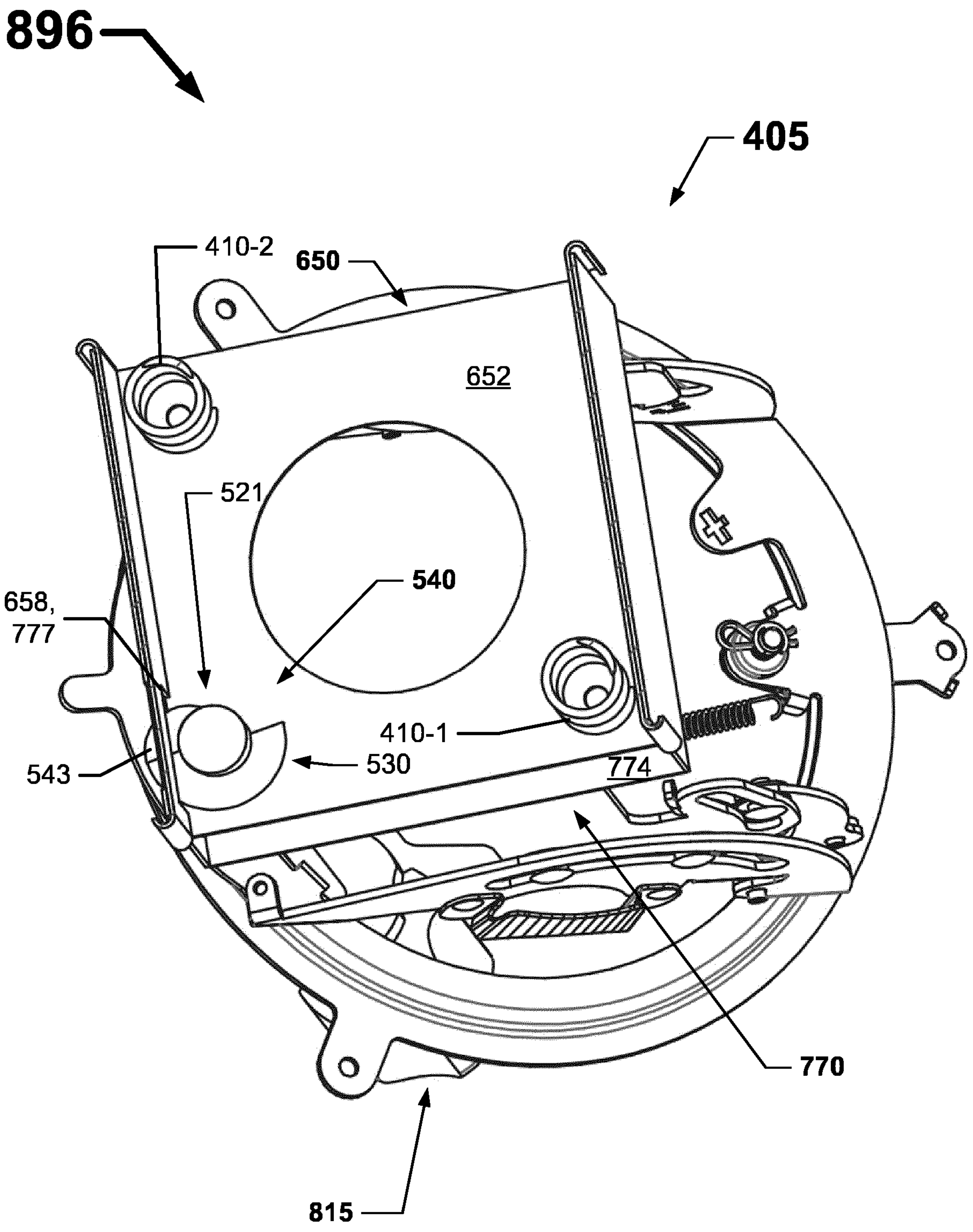

FIGS. 8A and 8B show sectional views of a portion 896 of the subsystem of FIGS. 3A and 3B implementing the depth control system 405 according to certain example embodiments. Specifically, FIG. 8A shows the portion 896 of the subsystem when a null area 521 and/or nonengagement portion 542 of the flange 544 of the adjustment device 530 is positioned adjacent to the slots 777 of the frame 770 through the opening 658 in the carriage 650. FIG. 8B shows the portion 896 of the subsystem when the engagement portion 543 of the flange 544 of the adjustment device 530 is positioned adjacent to the slots 777 of the frame 770 through the opening 658 in the carriage 650. The light source and other components of the recessed luminaire are removed from FIGS. 8A and 8B to more clearly show how the example depth control system 405 operates.

Referring to FIGS. 1 through 8B, in the portion 896 of the subsystem shown in FIG. 8A, a user device 815 in the form of a screwdriver is inserted through the adjustment device access port 776 in the base wall 774 of the frame 770 to engage the user device receiving feature (hidden from view) at the distal end of the shaft of the lower portion of the adjustment device 530. By rotating the user device 815 to the point shown in FIG. 8A, the null area 521 and/or the nonengagement portion 542 of the flange 544 is positioned adjacent to the slots 777 of the frame 770 through the opening 658 in the carriage 650. When this occurs, the resilient devices 410 (resilient device 410-1 and resilient device 410-2) are able to expand and push the carriage 650 downward, toward the base wall 774 of the frame 770, to a default position relative to the frame 770. This downward force imposed by the resilient devices 410 can be countered by a sufficiently large upward force applied by a user through the user device 815. Such an upward force through the user device 815 can increase the distance between the carriage 650 and the base wall 774 of the frame 770.

When the depth of the recessed luminaire (in other words, when the distance between the carriage 650 and the base wall 774 of the frame 770) is to the preference of the user, the user can use the user device 815, still inserted through the adjustment device access port 776 (hidden from view in FIG. 8B) in the base wall 774 of the frame 770, to rotate the adjustment device 530 to the point where part of the engagement portion 543 of the flange 544 of the adjustment device 530 is disposed in and extends through the opening 658 in the carriage 650 and the slot 777 in the frame 770 that aligns with the positioning of the carriage 650 relative to the frame 770. When the engagement portion 543 of the flange 544 is engaged with a slot 777 in the frame 770, the position of the carriage 650 remains fixed relative to the frame 770, despite any downward force that the resilient devices 410 may impose on the carriage 650. If no further adjustments to the depth are needed, the user can retract the user device 815 through the adjustment device access port 776 in the base wall 774 of the frame 770.

Figure 9A:
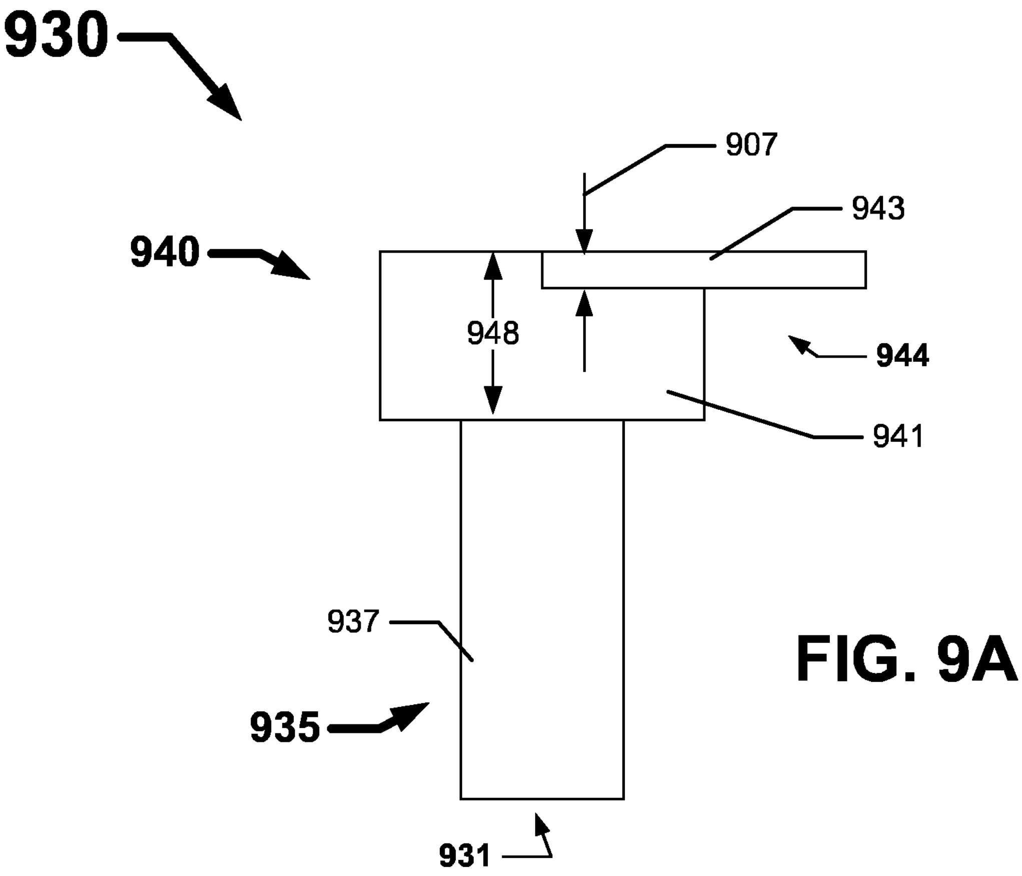
FIGS. 9A and 9B show another adjustment device of a depth control system according to certain example embodiments.
Figure 9B:
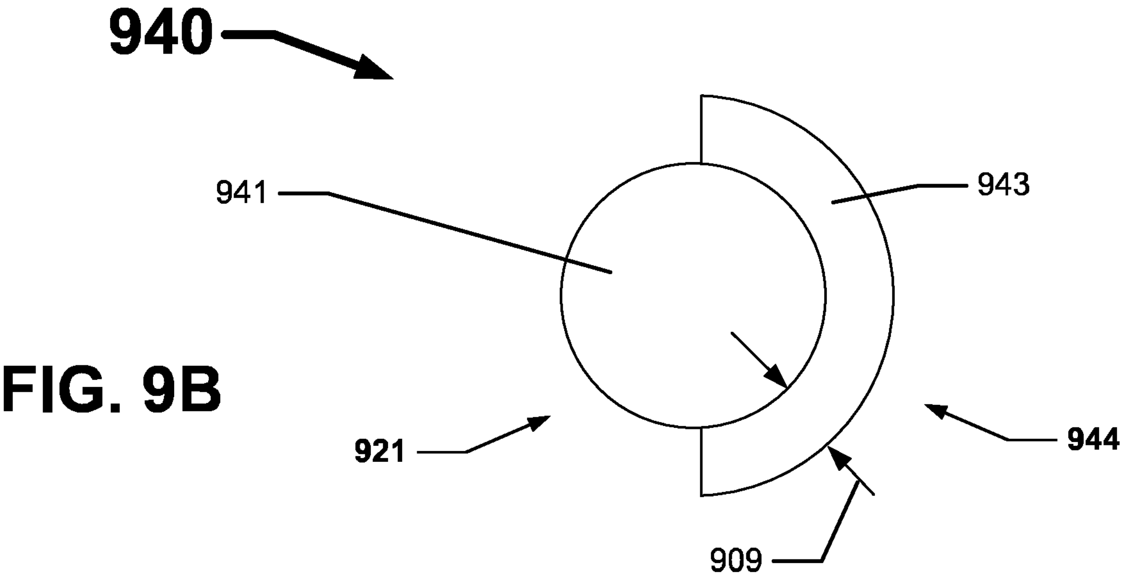

FIGS. 9A and 9B show another adjustment device 930 of a depth control system according to certain example embodiments. Specifically, FIG. 9A shows a side view of the adjustment device 930, and FIG. 9B shows a top view of the top portion 940 of the adjustment device 930 of FIG. 9A. Referring to FIGS. 1 through 9B, the adjustment device 930 of FIGS. 9A and 9B is substantially the same as the adjustment device 530 of FIGS. 5A through 5E, except as discussed below. For example, the adjustment device 930 of FIGS. 9A and 9B includes a lower portion 935 and an upper portion 940. The lower portion 935 can include a user device receiving feature 931 disposed in a distal end of the shaft 937 of the lower portion 935. The lower portion 935 can also include one or more retention features (not shown, but similar to retention feature 529) disposed on the shaft 937.

The upper portion 940 of the adjustment device 930 can include a base 941 and a flange 944 that extends away (in this case, laterally) from the base 941. The base 941 of the upper portion 940 can have a configuration (in this case, cylindrically shaped) similar to the shaft 937 of the lower portion 940, but with a larger diameter. The axis along the length 948 of the base 941 is the same as the axis along the length of the shaft 937. The flange 944 of the upper portion 940 of the adjustment device 930 in this case includes an engagement portion 943 that is horizontal (in this case, substantially parallel to the top surface of the base 941 and covers approximately 180° of the outer perimeter of the base 941 when viewed from above, as shown in FIG. 9B.

The engagement portion 943 of the flange 944 has a height 907 that is less than the height of any of the slots (e.g., slots 777) in the frame (e.g., frame 770). The engagement portion 943 of the flange 944 also has a width 909 that is great enough to extend through one or more slots (e.g., slots 777) in the left side wall (e.g., left side wall 772) of the frame (e.g., frame 770) when the adjustment device 930 is rotatably coupled to the adjustment device receiving feature (e.g., adjustment device receiving feature 655) in the base wall (e.g., base wall 652) of the carriage (e.g., carriage 650).

The other half of the outer perimeter of the base 941 when viewed from above has a null area 921 where there is no part of the flange 944 that extends away from the outer surface of the base 941 of the upper portion 940 of the adjustment device 930. There is no nonengagement portion (similar to nonengagement portion 542) of the flange 944, but the null area 921 serves the same functional purpose as a nonengagement portion to allow for large changes in depth].

Figure 10A:
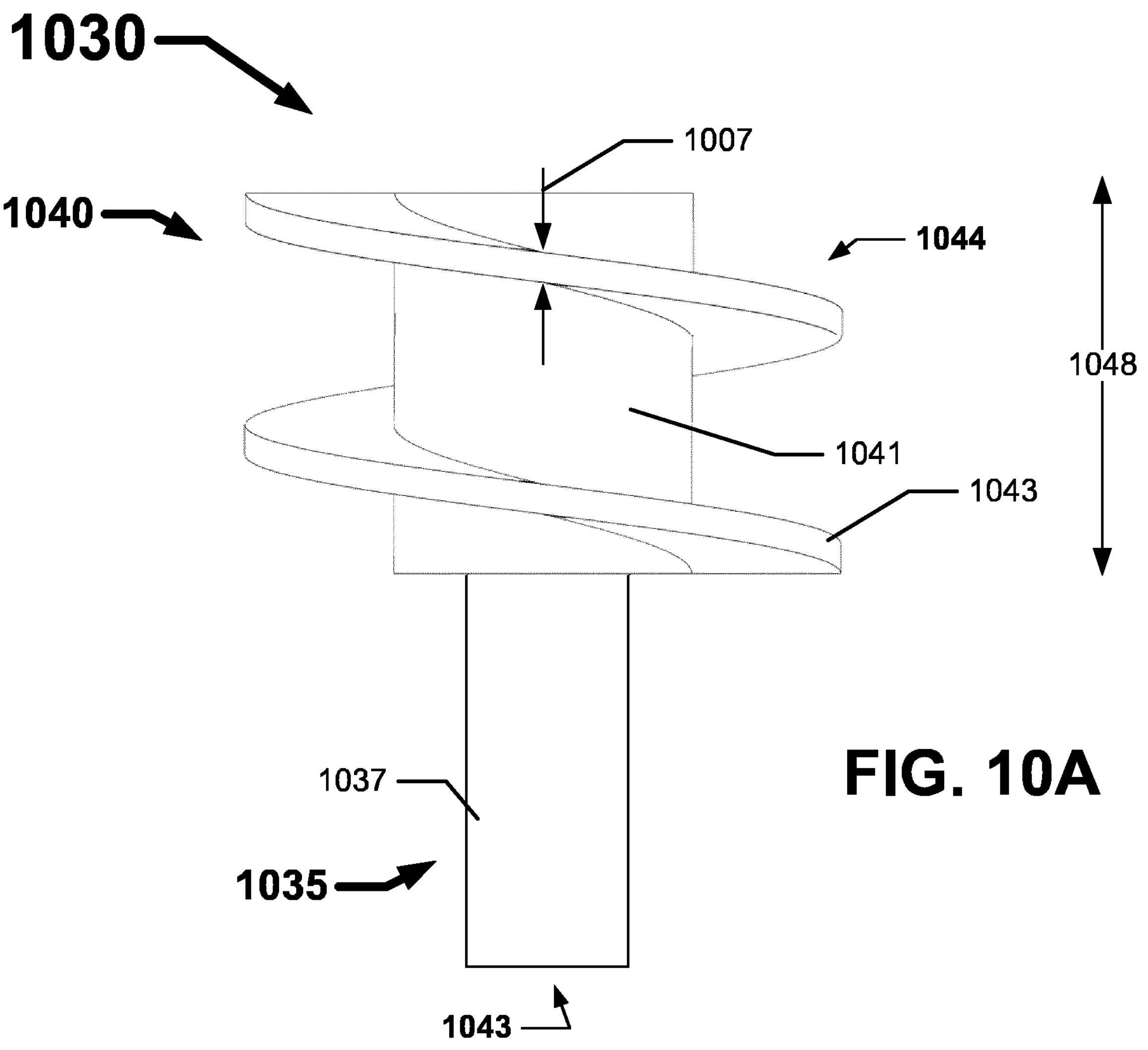
FIGS. 10A and 10B show yet another adjustment device of a depth control system according to certain example embodiments.
Figure 10B:
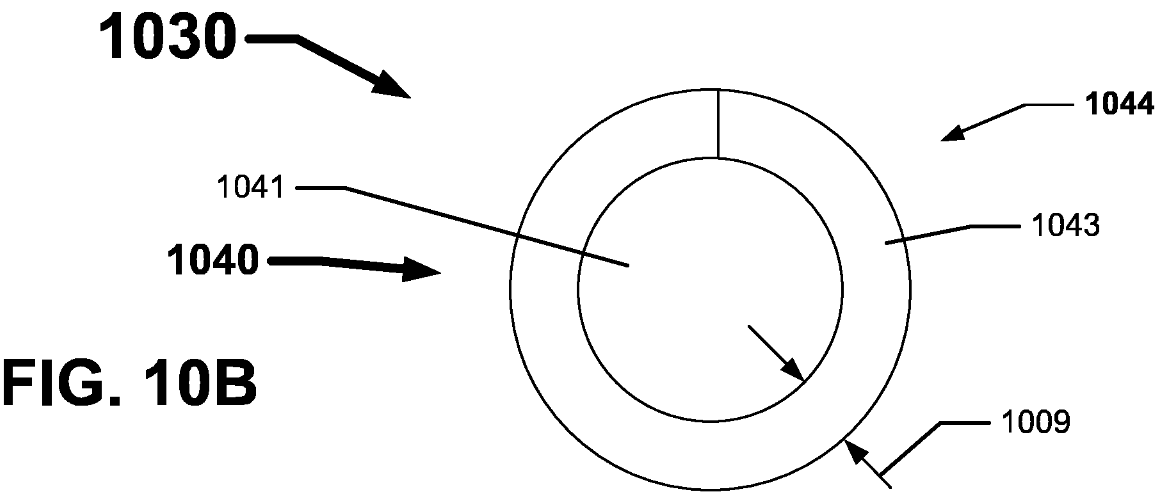

FIGS. 10A and 10B show yet another adjustment device 1030 of a depth control system according to certain example embodiments. Specifically, FIG. 10A shows a side view of the adjustment device 1030, and FIG. 10B shows a top view of the top portion 1040 of the adjustment device 1030 of FIG. 10A. Referring to FIGS. 1 through 10B, the adjustment device 1030 of FIGS. 10A and 10B is substantially the same as the adjustment device 530 of FIGS. 5A through 5E, except as discussed below. For example, the adjustment device 1030 of FIGS. 10A and 10B includes a lower portion 1035 and an upper portion 1040. The lower portion 1035 can include a user device receiving feature 1031 disposed in a distal end of the shaft 1037 of the lower portion 1035. The lower portion 1035 can also include one or more retention features (not shown, but similar to retention feature 529) disposed on the shaft 1037.

The upper portion 1040 of the adjustment device 1030 can include a base 1041 and a flange 1044 that extends away (in this case, laterally) from the base 1041. The base 1041 of the upper portion 1040 can have a configuration (in this case, cylindrically shaped) similar to the shaft 1037 of the lower portion 1040, but with a larger diameter. The axis along the length 1048 of the base 1041 is the same as the axis along the length of the shaft 1037. The flange 1044 of the upper portion 1040 of the adjustment device 1030 in this case includes an engagement portion 1043 that is sloped relative to the horizontal, creating a spiral that covers approximately 540° of the outer perimeter of the base 1041 when viewed from above and spanning the entire length 1048 of the base 1041.

This configuration can allow multiple (in this case, two) slots (e.g., slots 777) in the frame (e.g., frame 770). The engagement portion 1043 of the flange 1044 has a height 1007 that is less than the height of any of the slots in the frame. The engagement portion 1043 of the flange 1044 also has a width 1009 that is great enough to extend through one or more slots in the left side wall (e.g., left side wall 772) of the frame when the adjustment device 1030 is rotatably coupled to the adjustment device receiving feature (e.g., adjustment device receiving feature 655) in the base wall (e.g., base wall 652) of the carriage (e.g., carriage 650). The flange 1044 in this case does not include a nonengagement portion (e.g., nonengagement portion 542) or a null area (e.g., null area 521, null area 921), and so any adjustments to the depth are made incrementally by rotating the adjustment device 1030.

Example embodiments can be used to allow a user to adjust and set the depth of a recessed luminaire (or portion thereof) when the recessed luminaire is installed with respect to a structure (e.g., a ceiling). Using example depth control systems (or portions thereof), a recessed luminaire can be adjusted with the use of a simple user device (e.g., a screwdriver) while the recessed luminaire remains installed (e.g., in a ceiling). Example embodiments can be used with recessed luminaires having any of a number of sizes and/or features. Example embodiments can be used in new installations of recessed luminaires as well as retrofitting existing luminaires. Example embodiments also provide a number of other benefits. Such other benefits can include, but are not limited to, increased ease of maintenance, greater ease of use, catering to user preferences, and compliance with industry standards that apply to luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. A depth control system for a recessed luminaire, the depth control system comprising:

a frame comprising a plurality of slots and a first light source receiving feature disposed therein;

a carriage slidably coupled to the frame, wherein the carriage comprises an adjustment device receiving feature and a second light source receiving feature disposed therein;

a resilient device coupled to and disposed between the frame and the carriage; and an adjustment device rotatably coupled to the carriage, wherein the adjustment device comprises a first portion and a second portion, wherein the first portion comprises a user device receiving feature configured to receive a user device, wherein the second portion comprises a base and a flange that extends away from the base, wherein the flange comprises an engagement portion that is configured to engage the plurality of slots in the frame when the adjustment device is rotated to position the engagement portion of the flange adjacent to the plurality of slots, wherein the flange rotates about an axis along a length of the first portion of the adjustment device when the user device receiving feature of the first portion is engaged by the user device to adjust a distance between the second light source receiving feature of the carriage and the first light source receiving feature of the frame.

2. The depth control system of claim 1, wherein the resilient device comprises a compression spring.

3. The depth control system of claim 1, wherein the engagement portion of the flange continuously traverses less than 270 degrees along an outer perimeter of the base of the second portion of the adjustment device.

4. The depth control system of claim 1, wherein the flange of the second portion of the adjustment device further comprises a nonengagement portion adjacent to the engagement portion, wherein the nonengagement portion fails to engage the plurality of slots in the frame when the adjustment device is rotated to position the nonengagement portion of the flange adjacent to the plurality of slots.

5. The depth control system of claim 4, wherein the nonengagement portion is substantially parallel to a top surface of the base of the second portion of the adjustment device.

6. The depth control system of claim 1, wherein the flange of the second portion of the adjustment device further comprises a null area where the flange fails to traverse along the outer perimeter of the base.

7. The depth control system of claim 1, wherein the engagement portion of the flange of the second portion of the adjustment device is antiparallel to a top surface of the base of the second portion of the adjustment device.

8. The depth control system of claim 7, wherein the engagement portion of the flange continuously traverses at least 360 degrees along an outer perimeter of the base of the second portion of the adjustment device.

9. The depth control system of claim 1, wherein the carriage comprises a base carriage wall and a left side carriage wall that extends upward from a first end of the base carriage wall, and wherein the left side carriage wall of the carriage is slidably coupled to a left side frame wall of the frame.

10. The depth control system of claim 9, wherein the carriage further comprises a right side carriage wall that extends upward from a second end of the base carriage wall that is opposite the first end, and wherein the right side carriage wall of the carriage is slidably coupled to a right side frame wall of the frame.

11. The depth control system of claim 10, wherein the adjustment device receiving feature and the second light source receiving feature of the frame comprise apertures that traverse the base carriage wall.

12. The depth control system of claim 11, wherein the left side carriage wall of the frame has an opening that traverses therethrough, wherein the opening is adjacent to the adjustment device receiving feature in the base carriage wall.

13. The depth control system of claim 1, wherein the frame comprises a base frame wall and a left side frame wall that extends upward from an end of the base frame wall, and wherein the first light source receiving feature and an adjustment device access port comprise apertures that traverse the base frame wall.

14. The depth control system of claim 13, wherein the plurality of slots traverse the left side frame wall, and wherein the plurality of slots are arranged in a parallel configuration stacked atop each other along a height of the left side frame wall.

15. The depth control system of claim 14, wherein the frame further comprises a top frame wall that extends laterally away from the left side frame wall, and wherein the resilient device is coupled to the top frame wall.

* * * * *